United States Patent
Morishima

(10) Patent No.: US 7,050,365 B2
(45) Date of Patent: May 23, 2006

(54) OPTICAL DISK INFORMATION RECORDING/REPRODUCING APPARATUS AND METHOD WITH LASER-BEAM FOCUS CONTROL

(75) Inventor: Morito Morishima, Fukuroi (JP)

(73) Assignee: Yamaha Corporation, Hamamatsu (JP)

( * ) Notice: Subject to any disclaimer, the term of this patent is extended or adjusted under 35 U.S.C. 154(b) by 298 days.

(21) Appl. No.: 10/366,105

(22) Filed: Feb. 13, 2003

(65) Prior Publication Data

US 2004/0004912 A1    Jan. 8, 2004

(30) Foreign Application Priority Data

Feb. 15, 2002  (JP) .......................... 2002-038984

(51) Int. Cl.
*G11B 7/00*    (2006.01)

(52) U.S. Cl. .................................. 369/44.32

(58) Field of Classification Search ............. 369/52.1, 369/44.27, 44.32; 347/200–264
See application file for complete search history.

(56) References Cited

U.S. PATENT DOCUMENTS

| | | | |
|---|---|---|---|
| 5,502,698 A * | 3/1996 | Mochizuki | 369/44.32 |
| 5,796,687 A * | 8/1998 | Baba | 369/44.29 |
| 5,798,161 A * | 8/1998 | Kita et al. | 428/64.1 |
| 5,953,296 A * | 9/1999 | Baba | 369/44.32 |
| 6,269,064 B1 * | 7/2001 | DeCusatis et al. | 369/59.25 |
| 6,529,468 B1 * | 3/2003 | Noda et al. | 720/710 |
| 6,704,257 B1 * | 3/2004 | Yamamiya | 369/44.27 |
| 6,864,907 B1 * | 3/2005 | Bronson | 347/224 |
| 2002/0191517 A1 * | 12/2002 | Honda et al. | 369/53.29 |

* cited by examiner

*Primary Examiner*—Tianjie Chen
(74) *Attorney, Agent, or Firm*—Pillsbury Winthrop Shaw Pittman LLP

(57) ABSTRACT

An optical disk apparatus is constructed for writing or reading information by irradiating a laser beam onto an optical disk while rotating the optical disk under a focus control of the laser beam relative to the rotated optical disk. In the optical disk apparatus, an irradiating section is operated to irradiate a laser beam onto the optical disk. A determining section determines a process pattern of the focus control by operating the irradiating section to irradiate the laser beam onto a predetermined area of the optical disk and by monitoring the laser beam reflected back from the predetermined area. A focusing section performs the focus control to regulate a spot diameter of the laser beam based on the determined process pattern during either of the writing or reading of information.

15 Claims, 17 Drawing Sheets

D: OPTICAL DISK

FIG.4
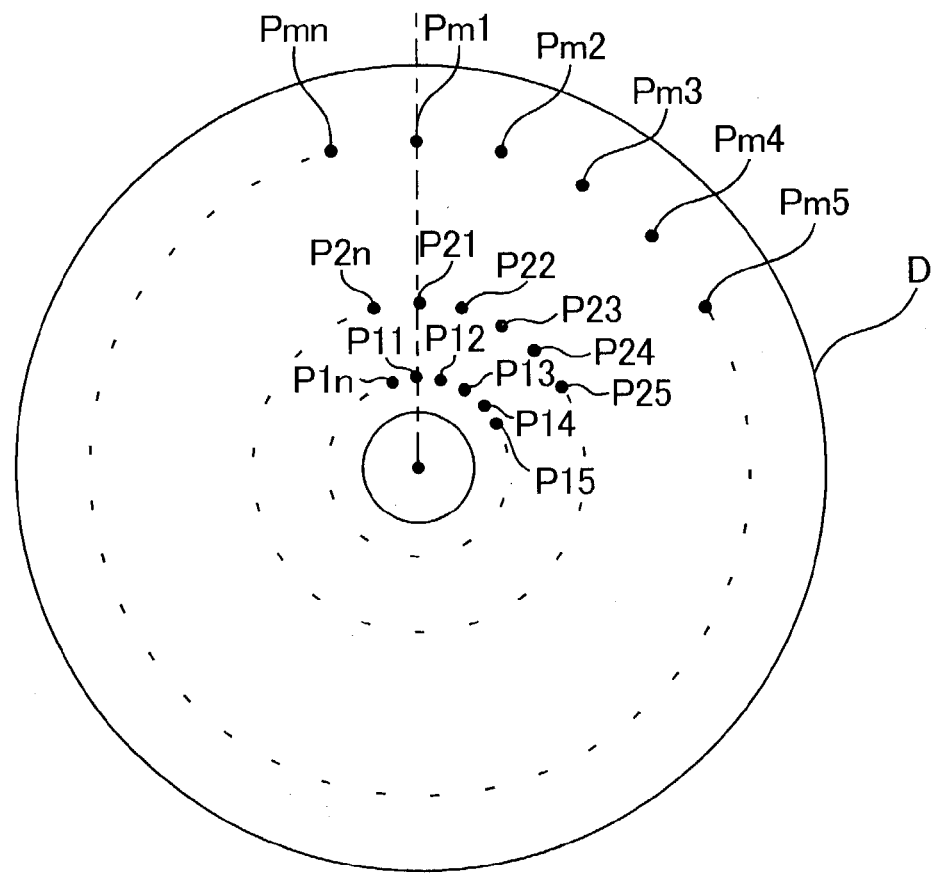
FIG.5
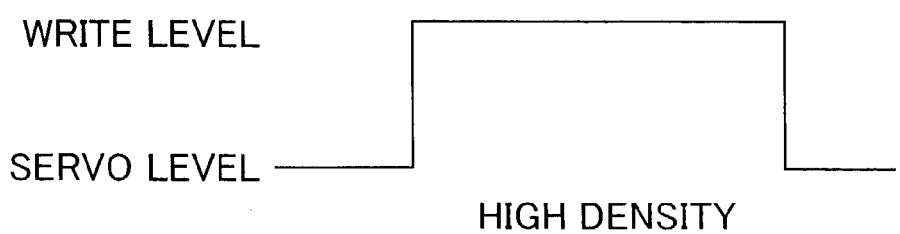
HIGH DENSITY
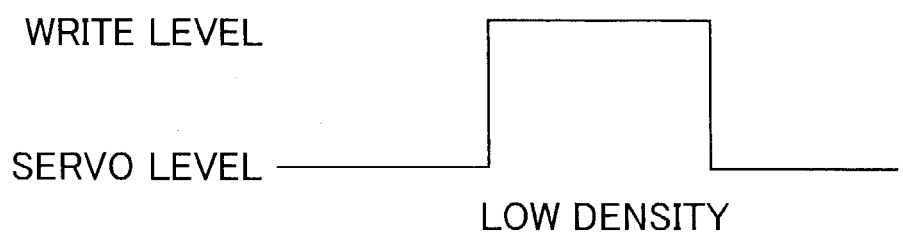
LOW DENSITY

D: OPTICAL DISK

FIG.16
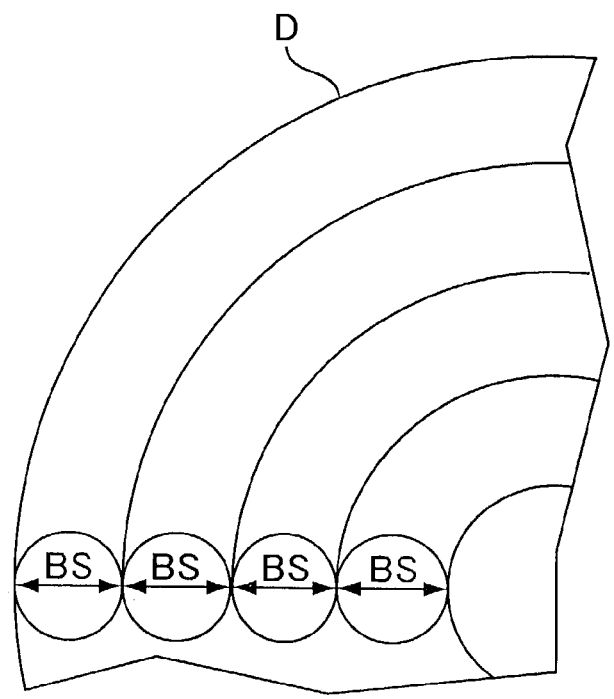
LARGE SPOT DIAMETER
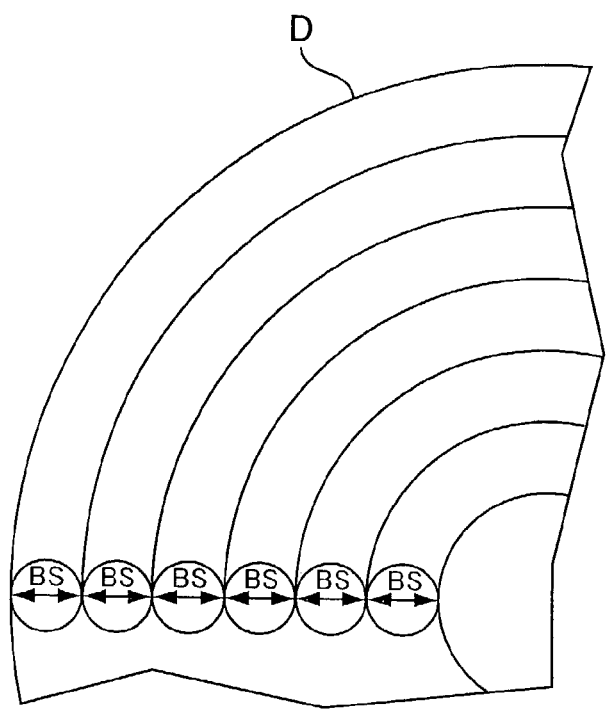
SMALL SPOT DIAMETER

OPTICAL DISK INFORMATION RECORDING/REPRODUCING APPARATUS AND METHOD WITH LASER-BEAM FOCUS CONTROL

BACKGROUND OF THE INVENTION

1. Industrial Field of Utilization

The present invention relates to an optical disk apparatus, which irradiates an optical disk with a laser beam, a focus control method thereof, and a computer program used for the focus control method.

2. Prior Art

Recordable optical disks such as CD-R (Compact Disc-Recordable) and CD-RW (Compact Disc-Rewritable) have been available in the prior art. When various data such as music data are recorded on these optical disks, optical disk recording/reproducing apparatuses such as CD-R or CD-RW drive units are used. These optical disk recording/reproducing apparatuses carry out information recording by irradiating a recording face formed on one side of an optical disk with laser beam from an optical pickup according to information to be recorded. On the other hand, when information recorded on the optical disk is read out, laser beam is also irradiated from the optical pickup to read the information from the return light of the laser beam reflected back from the record face of the optical disk.

When irradiating laser beam on the recording face of the optical disk, the optical disk recording apparatuses perform focus control so that the laser beam of a desirable spot diameter will be irradiated on the recording face. In this focus control operation, return light of the laser beam irradiated on the recording face of the optical disk is received, and focus control is performed using an astigmatic method.

The above-mentioned focus control in a conventional optical disk recording apparatus is feedback control in which a return light of the laser beam irradiated on an optical disk is acquired to perform the focus control based on the return light acquired. Therefore, if the laser beam is irradiated to an area with no reflecting face formed on it, a sufficient amount of return light cannot be obtained to disable the focus control.

For example, suppose that a thermo-sensitive face is provided on an optical disk on the side opposite to a recording face on which music data or the like is recorded. Suppose further that the thermo-sensitive face is irradiated with laser beam to discolor the thermo-sensitive face so that a character image such as a music title of music data will be formed. In this case, since the laser beam has to be irradiated on the thermo-sensitive face from which an amount of reflected light equal to or larger than that from the recording face cannot be obtained, accurate focus control cannot be performed.

SUMMARY OF THE INVENTION

The present invention has been made in view of the above-mentioned circumstances, and it is an object thereof to provide an optical disk apparatus, and a focus control method and program, capable of performing accurate focus control even when a laser beam is irradiated to an area of an optical disk from which a sufficient amount of reflected light of the laser beam cannot be obtained.

To solve the above-mentioned problem, according to the present invention, an optical disk apparatus is constructed for writing or reading information by irradiating a laser beam onto an optical disk while rotating the optical disk under a focus control of the laser beam relative to the rotated optical disk. The inventive optical disk apparatus comprises an irradiating section that is operated to irradiate a laser beam onto the optical disk, a determining section that determines a process pattern of the focus control by operating the irradiating section to irradiate the laser beam onto a predetermined area of the optical disk and by monitoring the laser beam reflected back from the predetermined area, and a focusing section that performs the focus control to regulate a spot diameter of the laser beam based on the determined process pattern during either of the writing or reading of information.

Preferably, the determining section operates the irradiating section to irradiate the laser beam along a predetermined round area during at least one turn of the optical disk, and monitors the laser beam reflected back from the predetermined round area so as to determine one round process pattern of the focus control in function of an angular position of the rotated optical disk. Then, the focusing section performs the focus control based on the determined one round process pattern in response to the angular position of the rotated optical disk.

Practically, the determining section determines a process pattern of the focus control based on a first round process pattern obtained from the laser beam reflected back from an innermost round area of the optical disk and a second round process pattern obtained from the laser beam reflected back from an outermost round area of the optical disk. Further, the determining section determines the process pattern of the focus control by interpolating the first round process pattern and the second round process pattern in terms of a radial position of the laser beam. Then, the focusing section performs the focus control based on the determined process pattern in response to the radial position of the laser beam.

Practically, the inventive optical disk apparatus further comprises a mount section that can rotatably mount an optical disk having a recording face writeable with data information and a thermo-sensitive face opposite to the recording face and writeable with image information, and an image forming section operative when the optical disk is mounted to expose the thermo-sensitive face for operating the irradiating section to irradiate the laser beam onto the thermo-sensitive face to thereby form the image information. In this case, the determining section determines the process pattern of the focus control such that the spot diameter of the laser beam irradiated onto the thermo-sensitive face is regulated greater than the spot diameter of the laser beam irradiated onto the recording face. Expediently, the inventive optical disk apparatus further comprises a reading section that operates the irradiating section to irradiate the laser beam onto the thermo-sensitive face of the optical disk to read therefrom the image information.

According to this structure, even when the information recording and reading are performed by irradiating the laser beam on a low-reflective face of the optical disk, the focus control can be performed according to the process pattern of focus control determined by the determining section, rather than based on the actual return light from the recording face. The process pattern of focus control determined by the determining section is based on the return light obtained by irradiating the laser beam to the predetermined area of the optical disk. The predetermined area of the optical disk is set to a high-reflective area of the optical disk, and therefore a sufficient amount of return light can be obtained. In this case, the process pattern of focus control determined based on this result becomes suitable for any optical disk set in the optical disk apparatus. Consequently, even when the laser beam is irradiated to a low-reflective area, accurate focus control can be performed.

According to the present invention, there is provided a method of focus control of a laser beam relative to an optical disk rotated in an optical disk apparatus for writing or reading information by irradiation of the laser beam onto the rotated optical disk. The inventive method comprises the steps of provisionally irradiating the laser beam onto a predetermined area of the optical disk, monitoring the laser beam reflected back from the predetermined area to detect a variation of a spot diameter of the laser beam, determining a process pattern of the focus control based on the detected variation of the spot diameter, conducting the irradiation of the laser beam onto the rotated optical disk for writing or reading information, and performing the focus control to regulate a spot diameter of the laser beam based on the determined process pattern during conducting the irradiation of the laser beam. The predetermined process pattern indicates an outline, contour or profile of the focus control, which should be followed by the optical disk apparatus for regulating the spot diameter of the laser beam during the information writing or reading operation. The process pattern of the focus control is provisionally obtained by test irradiation or trial irradiation of the laser beam.

According to the present invention, there is provided a program for use in an optical disk apparatus having a processor for writing or reading information by irradiation of a laser beam onto an optical disk while rotating the optical disk under a focus control of the laser beam relative to the rotated optical disk. The program may be stored in a machine readable medium for loading into the optical disk apparatus. The inventive program is executable by the processor for causing the optical disk apparatus to perform a focus control process comprising the steps of provisionally irradiating the laser beam onto a predetermined area of the optical disk, monitoring the laser beam reflected back from the predetermined area to detect a variation of a spot diameter of the laser beam, determining a process pattern of the focus control based on the detected variation of the spot diameter, conducting the irradiation of the laser beam onto the rotated optical disk for writing or reading information, and performing the focus control to regulate a spot diameter of the laser beam based on the determined process pattern during conducting the irradiation of the laser beam.

BRIEF DESCRIPTION OF THE DRAWINGS

FIG. 4 is a diagram for explaining contents of image data used by the optical disk recording/reproducing apparatus for formation of a visible image on a thermo-sensitive face of the optical disk.

FIG. 5 is a diagram for explaining irradiation control of laser beam, representing the density gradation of the image when formed on the thermo-sensitive face by the optical disk recording/reproducing apparatus.

FIG. 16 is a diagram for explaining the size of a beam spot diameter of a laser beam irradiated on the thermo-sensitive face of the optical disk by means of the optical pickup of the optical disk recording/reproducing apparatus.

DETAILED DESCRIPTION OF THE INVENTION

Embodiments of the present invention will now be described with reference to the accompanying drawings.

A. Structure of Embodiment

The present invention provides an optical disk recording/reproducing apparatus for irradiating laser beam on a recording face of an optical disk to record information. The optical disk recording/reproducing apparatus has not only the function for recording information on the recording face, but also a function for forming a visible image corresponding to image data by irradiating laser beam on a thermo-sensitive face of the optical disk, the thermo-sensitive face being formed on the side opposite to the recording face. The following describes the structure of an optical disk on which the formation of such a visible image is possible, and then the structure of an optical disk recording/reproducing apparatus capable of carrying out information recording and formation of a visible image on the optical disk.

A-1. Structure of Optical Disk

Figure 1:
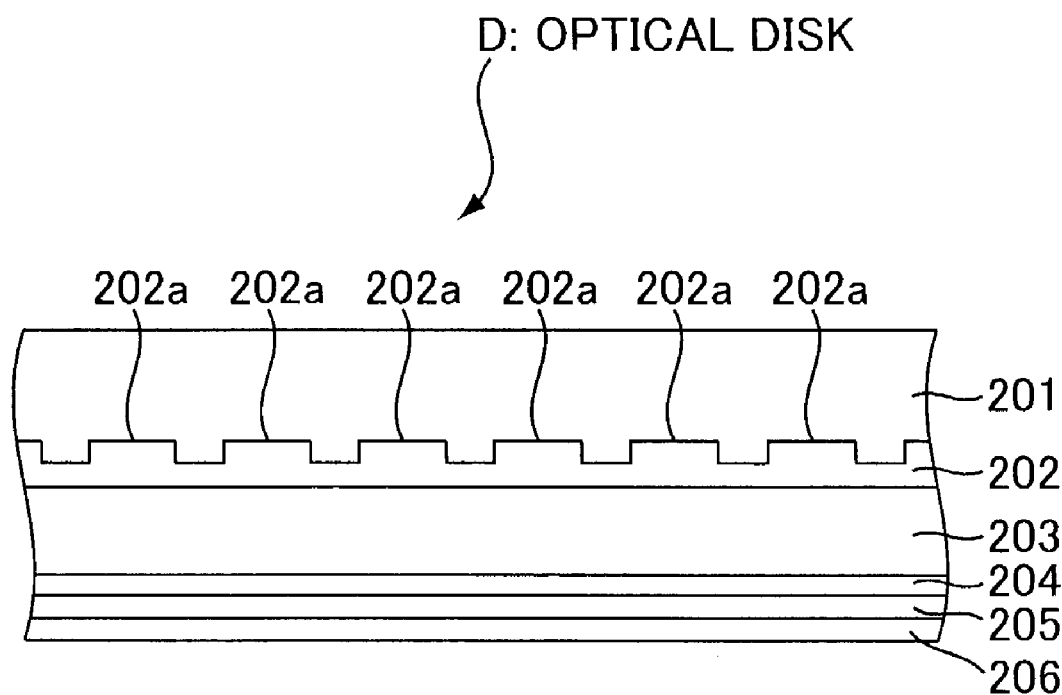
FIG. 1 is a side sectional view schematically showing the structure of an optical disk on which an optical disk recording/reproducing apparatus according to one preferred embodiment of the present invention can form a visible image.

FIG. 1 is a side sectional view showing the structure of a disk-shaped optical disk capable of recording information on one side and forming a visible image on the other side. As shown in FIG. 1, the optical disk D has a protective layer 201, a recording layer (recording face) 202, a reflective layer 203, a protective layer 204, a thermo-sensitive layer (thermo-sensitive face) 205, and a protective layer 206. These layers are laminated in this order. It should be noted that the figure schematically shows the structure of the optical disk D, and the ratio of dimensions or the like between the layers is exaggerated.

A groove (guide groove) 202a is formed on the recording layer 202 in a spiral shape. When information is recorded on the optical disk D, laser beam is irradiated along the groove 202a. Therefore, when information is recorded, the top face (hereinbelow, called the recording face) on the side of the protective layer 201 (the upper side in the figure) of the optical disk D is set to face an optical pickup of the optical disk recording/reproducing apparatus. In this case, the laser beam irradiated from the optical pickup is moved along the groove 202a to record the information. On the other hand, when a visible image is formed on the back face of the optical disk D, the optical disk D is so set that the back face (hereinbelow, called the thermo-sensitive face) on the side of the protective layer 206 faces the optical pickup of the optical disk recording/reproducing apparatus according to the present invention. Then the laser beam is irradiated to the thermo-sensitive layer 205 to thermally discolor a desirable position of the thermo-sensitive layer 205, thus forming the visible image. As mentioned above, since the optical disk D has almost the same structure as the conventionally used CD-R, except that the thermo-sensitive layer 205 is provided, detailed descriptions of the other layers such as the recording layer 202 will be omitted. In the specification, the term "thermo-sensitive face" denotes a face varying in color when irradiated with laser beam. This face is formed from the thermo-sensitive layer 205 having such color varying properties.

A-2. Structure of Optical Disk Recording/Reproducing Apparatus

Figure 2:
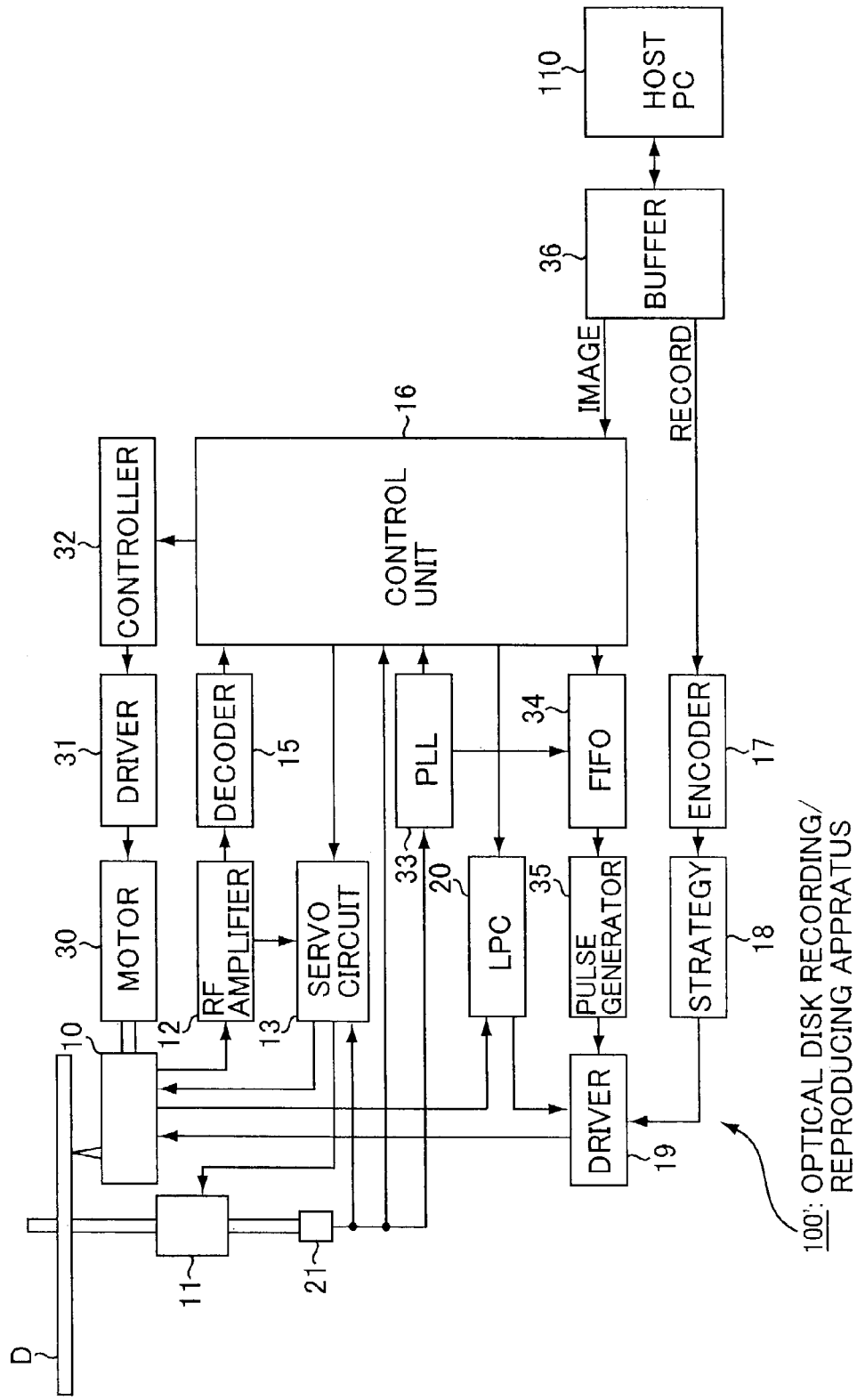
FIG. 2 is a block diagram showing the structure of the optical disk recording/reproducing apparatus according to the embodiment of the present invention.

FIG. 2 is a block diagram showing the structure of the optical disk recording/reproducing apparatus according to one embodiment of the present invention. As shown, the optical disk recording/reproducing apparatus 100 is connected to a host personal computer (PC) 110. The optical disk recording/reproducing apparatus 100 includes an optical pickup 10, a spindle motor 11, an RF (Radio Frequency) amplifier 12, a servo circuit 13, a decoder 15, a control unit 16, an encoder 17, a strategy circuit 18, a laser driver 19, a laser power control circuit 20, a frequency generator 21, a stepping motor 30, a motor driver 31, a motor controller 32, a PLL (Phase Locked Loop) circuit 33, a FIFO (First In First Out) memory 34, a driving pulse generator 35, and a buffer memory 36.

The spindle motor 11 is provided for driving the optical disk D to rotate for data recording. The servo circuit 13 controls the RPM (Revolutions Per Minute) of the spindle motor 11. In the embodiment, since the optical disk recording/reproducing apparatus 100 carries out recording and the like by a CAV (Constant Angular Velocity) method, the spindle motor 11 runs at a constant angular speed set on the instructions of the control unit 16 or the like.

Figure 3:
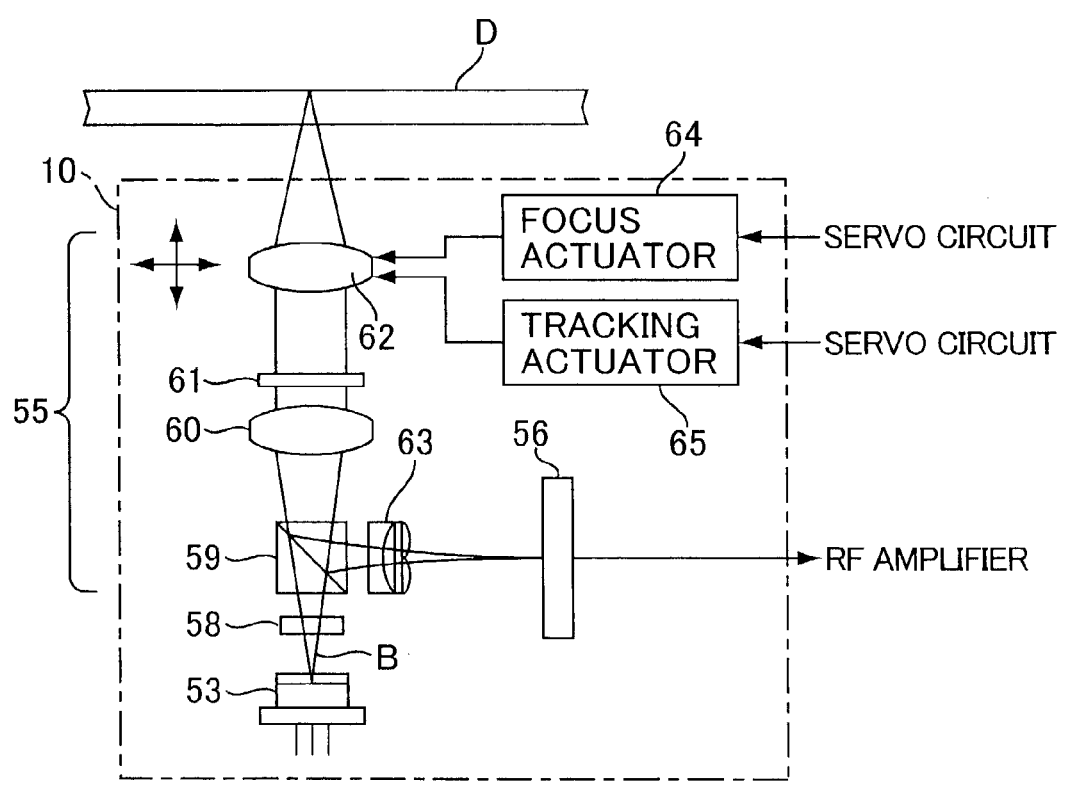
FIG. 3 is a diagram showing a structure of an optical pickup as a component of the optical disk recording/reproducing apparatus.

The optical pickup 10 is a unit for irradiating laser beam to the optical disk D rotated by the spindle motor 11. FIG. 3 shows the arrangement of the optical pickup 10. As shown, the optical pickup 10 includes a laser diode 53 for outputting laser beam B, a diffraction grating 58, an optical system 55 for condensing and focusing the laser beam B on the face of the optical disk D, and a light-receiving element 56 for receiving reflected light of the laser beam.

In the optical pickup 10, the laser diode 53 is supplied with driving current from the laser driver 19 (see FIG. 2) to output the laser beam B of certain intensity corresponding to the driving current. The optical pickup 10 divides the laser beam B outputted from the laser diode 53 into a main beam, a preceding beam, and a following beam by means of the diffraction grating 58, and passes the three laser beams through a polarization beam splitter 59, a collimator lens 60, a ¼ wavelength plate 61, and an objective lens 62 to focus the laser beam on the face of the optical disk D. Then the optical pickup 10 repasses the three laser beams reflected from the optical disk D through the objective lens 62, the ¼ wavelength plate 61, and the collimator lens 60, reflects them on the polarization beam splitter 59, and makes the reflected light incident on the light-receiving element 56 through a cylindrical lens 63. The light-receiving element 56 outputs a signal of the received light to the RF amplifier 12 (see FIG. 2). The received light signal is supplied to the control unit 16 and the servo circuit 13 through the RF amplifier 12.

The objective lens 62 is held by a focus actuator 64 and a tracking actuator 65 so that it can move in the direction of the optical axis of the laser beam B and the direction of the radius of the optical disk D. The focus actuator 64 and the tracking actuator 65 move the objective lens 62 in the direction of the optical axis and the direction of the radius in response to a focus error signal and a tracking error signal from the servo circuit 13 (see FIG. 2), respectively. Suppose that the laser beam is irradiated on the recording face of the optical disk D, for example, data is recorded on a common CD-R or suppose that the laser beam is irradiated for reading data from a CD-ROM. In such a case, the servo circuit 13 generates the focus error signal and the tracking error signal based on a received light signal supplied through the light-receiving element 56 and the RF amplifier 12, so that the objective lens 62 is moved, thereby performing focus control and tracking control, that is, feedback control. On the other hand, when the laser beam is irradiated on a low-reflective face such as the thermo-sensitive face of the optical disk D, the servo circuit 13 carries out open-loop focus control according to the process pattern of focus control determined by the control unit 16 as described later, rather than the feedback control based on the return light.

The optical pickup 10 also has a front monitor diode, not shown, through which a current is passed while the laser diode 53 is outputting the laser beam. The current is supplied from the optical pickup 10 to the laser power control circuit 20 shown in FIG. 2.

The RF amplifier 12 amplifies an RF signal that has been subjected to EFM (Eight-to-Fourteen Modulation) and supplied form the optical pickup 10, and outputs the amplified RF signal to the servo circuit 13 and the decoder 15. Upon reproduction, the decoder 15 EFM-demodulates the EFM-modulated RF signal supplied from the RF amplifier 12 to generate reproduced data.

The servo circuit 13 is supplied with a control signal from the control unit 16, an FG pulse signal of a frequency corresponding to the RPM of the spindle motor 11 and supplied from the frequency generator 21, and the RF signal from the RF amplifier 12. Based on the signals supplied, the servo circuit 13 performs rotation control of the spindle motor 11, focus control and tracking control of the optical pickup 10. As mentioned above, when the laser beam is irradiated to a low-reflective area, the RF signal is not used for the focus control. Further, when a visible image is formed on the thermo-sensitive face of the optical disk D, unlike when recording is performed on the recording face, it is unnecessary to trace irradiation positions along the pre-formed groove (guide groove) or the like. Therefore, in the embodiment, the target value for tracking control is fixed (that is, a constant offset voltage is set for the tracking actuator).

The driving method for the spindle motor 11 when information is recorded on the recording face (see FIG. 1) of the optical disk D or when a visible image is formed on the thermo-sensitive face (see FIG. 1) of the optical disk D may be either a method of driving the optical disk D with a constant angular speed (CAV: Constant Angular Velocity) or a method of driving the optical disk D to rotate at a constant linear running speed (CLV: Constant Linear Velocity). The optical disk recording/reproducing apparatus 100 according to the embodiment employs the CAV method, and the servo circuit 13 drives the spindle motor 11 to run at a constant angular speed specified by the control unit 16.

The buffer memory 36 stores information to be recorded on the recording face of the optical disk D (hereinbelow, called recording data) and information corresponding to a visible image to be formed on the thermo-sensitive face of the optical disk D (hereinbelow, called image data), both of which are supplied from the host PC 110. The recording data stored in the buffer memory 36 is outputted to the encoder 17, and the image data is outputted to the control unit 16.

The encoder 17 EFM-modulates the recording data supplied from the buffer memory 36, and outputs it to the strategy circuit 18. The strategy circuit 18 performs time-base correction and the like for the EFM signal supplied from the encoder 17, and outputs it to the laser driver 19.

The laser driver 19 drives the laser diode 53 (see FIG. 3) of the optical pickup 10 based on the signal modulated according to the recording data and supplied from the strategy circuit 18 under the control of the laser power control circuit 20.

The laser power control circuit 20 controls the power of the laser beam irradiated from the laser diode 53 (see FIG. 3) of the optical pickup 10. Specifically, the laser power control circuit 20 controls the laser driver 19 so that a laser beam having a certain power equal to a target value for the optimum laser power specified by the control unit 16 will be irradiated from the optical pickup 10. The laser power control by the laser power control circuit 20 is feedback control using a current value supplied from the front monitor diode of the optical pickup 10 to irradiate laser beam of the target intensity from the optical pickup 10.

The image data supplied from the host PC 110 and stored in the buffer memory 36 is supplied through the control unit 16, and sequentially stored in the FIFO memory 34. The image data stored in the FIFO memory 34, that is, the image data supplied from the host PC 110 to the optical recording/reproducing device 100 contains the following information. Since the image data is to form a visible image on the face of the disk-shaped optical disk D, it describes, as shown in FIG. 4, information indicative of a gradient (density) at each of n coordinate points (indicated with black dots in the figure) on many concentric circles arranged about the center O of the optical disk D. The image data describes such information that indicates a gradient at each of the coordinate points on the concentric circles in the order from the innermost circle to outermost circle, that is, from coordinate points P11, P12, . . . , P1n belonging to the innermost circle, coordinate points P21, P22, . . . , P2n belonging to the next innermost circle, coordinate points belonging intermediate circled, to a coordinate point Pmn on the outermost circle. Thus the information on the gradient at each coordinate point on such polar coordinates is supplied to the FIFO memory 34 in the above-mentioned order. It should be noted that FIG. 4 is a schematic diagram for clearly showing the positional relationship between coordinate points, and actual coordinate points are more crowded than those shown. Further, if the image data to be formed on the thermo-sensitive face of the optical disk D is created in the host PC 110 in a commonly used format such as the bitmap format, the host PC 110 will have only to convert the bitmap data to polar coordinate data. The converted image data is sent from the host PC 110 to the optical disk recording/reproducing apparatus 100.

Then, when a visible image is formed on the thermo-sensitive face of the optical disk D based on the image data supplied, a clock signal for image recording is supplied from the PLL circuit 33 to the FIFO memory 34. The FIFO memory 34 outputs to the driving pulse generator 35 information indicative of a gradient at a coordinate point in the order from the earliest stored one each time a clock pulse of the clock signal for image recording is supplied.

The driving pulse generator 35 generates a driving pulse for controlling the irradiation timing of laser beam from the optical pickup 10 when the visible image is formed on the thermo-sensitive face of the optical disk D. In this case, the driving pulse generator 35 generates a driving pulse of certain pulse width corresponding to the information indicative of the gradient at each coordinate point supplied from the FIFO memory 34. For example, when the gradient at a certain coordinate point is relatively large (when density is high), such a driving pulse that the pulse width of write level is set to a large value is generated as shown in the upper side of FIG. 5. On the other hand, when it is relatively small, such a driving pulse that the pulse width of write level is set to a small value is generated as shown in the lower side of FIG. 5. The term "write level" denotes a power level of laser enough to make the thermo-sensitive face (thermo-sensitive layer 205) obviously discolored when such a power level of laser is irradiated on the thermo-sensitive face of the optical disk D. When such a driving pulse is supplied to the laser driver 19, laser beam of the write level is irradiated from the optical pickup 10 during a period of time corresponding to the pulse width. Therefore, the larger the gradient, the longer the irradiation time of the laser beam of the write level. In this case, since the discolored area in a unit area of the thermo-sensitive face of the optical disk D becomes larger, the user perceives that this area is highly dense. In the embodiment, the length of the discolored area per unit area (unit length) is varied to represent the gradient indicated in the image data. Here, the term "servo level" denotes a power level at which the thermo-sensitive face remains about the same when laser of this power level is irradiated on the thermo-sensitive face of the optical disk D. Therefore, the laser beam of the servo level, rather than the laser beam of the write level, can be irradiated to an area unnecessary to be discolored.

Figure 6:
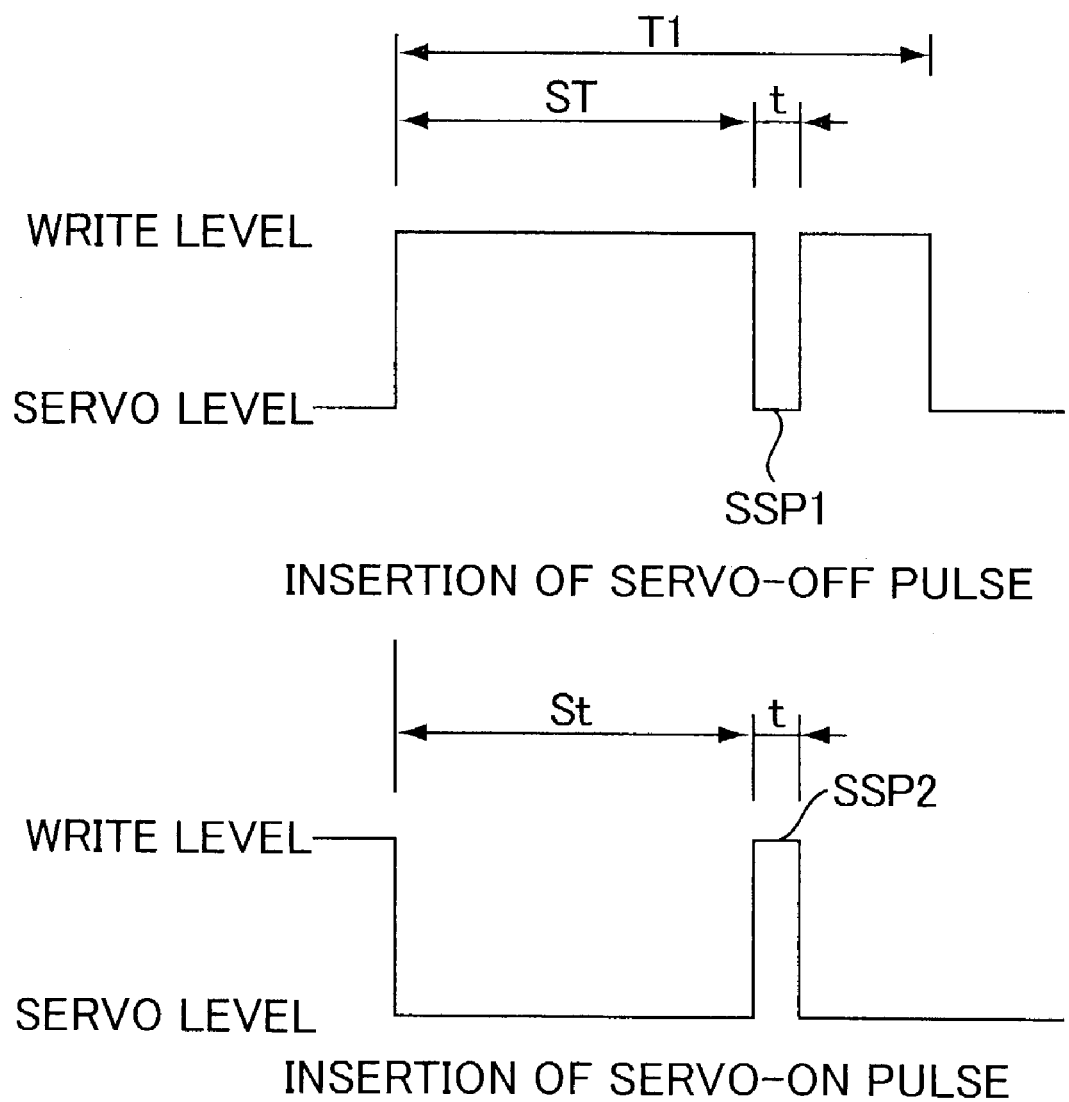
FIG. 6 is a diagram for explaining a control method of laser beam when the optical disk recording/reproducing apparatus forms the visible image on the thermo-sensitive face of the optical disk.

The driving pulse generator 35 thus generates the driving pulse according to the information indicative of the gradient at each coordinate point. In addition, the driving pulse generator 35 may insert a pulse of the write level or servo level for a very short time period when required for laser power control by the laser power control circuit 20, or focus control and tracking control by the servo circuit 13. For example, as shown in the upper side of FIG. 6, suppose that the laser beam of the write level needs to be irradiated for a period of time T1 so that the visible image will be represented according to the gradient at a coordinate point in the image data. In this case, if the period of time T1 is longer than a predetermined servo period ST for controlling the laser power, a servo-off pulse (SSP1) is inserted for a very short time t when the servo period ST has elapsed after the pulse of the write level was generated. On the other hand, as shown in the lower side of FIG. 6, suppose that the laser beam of the servo level needs to be irradiated for a period longer than the servo period ST so that the visible image will be represented according to the gradient at a coordinate point in the image data. In this case, a servo-on pulse (SSP2) is inserted when the servo period ST has elapsed since the pulse of the servo level was generated.

Figure 7:
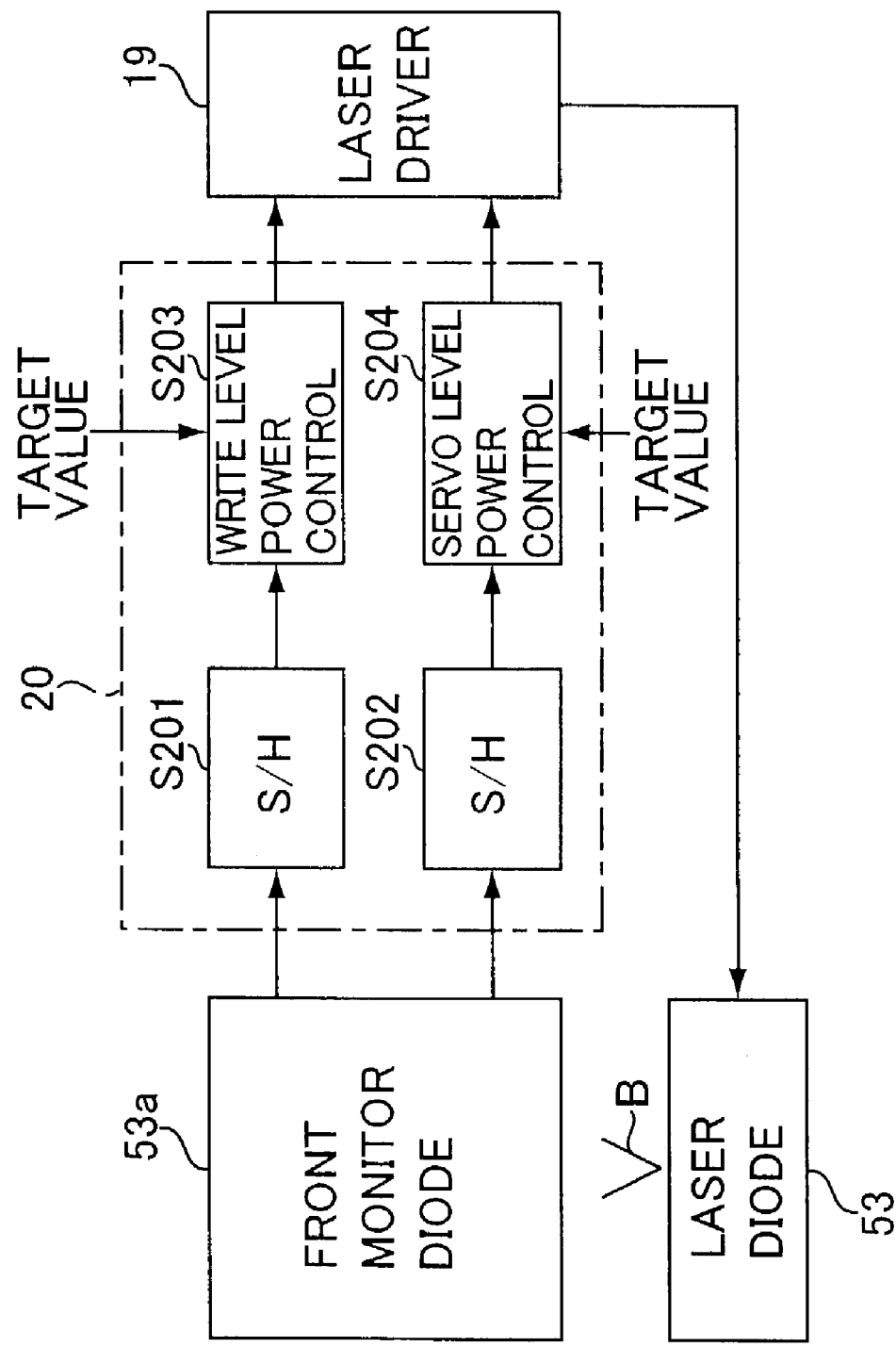
FIG. 7 is a diagram for explaining the control of laser power by a laser power control circuit as a component of the optical disk recording/reproducing apparatus.

As mentioned above, the laser power control by the laser power control circuit 20 is carried out based on the current (of a value corresponding to the intensity of the laser beam irradiated) supplied from the front monitor diode that has received the laser beam irradiated from the laser diode 53 (see FIG. 3) of the optical pickup 10. To be more specific, as shown in FIG. 7, the laser power control circuit 20 samples and holds a value corresponding to the intensity of irradiated laser beam received by such a front monitor diode 53a (S201 and S202). Then, based on the result of the sample-and-hold operation performed while the laser beam is being irradiated at the write level as the target value, that is, while a driving pulse of the write level is being generated (see FIGS. 5 and 6), the laser power control is so performed that the laser beam of the target write level value supplied from the control unit 16 is irradiated (S203). On the other hand, based on the result of the sample-and-hold operation performed while the laser beam is being irradiated at the servo level as the target value, that is, while a driving pulse of the servo level is being generated (see FIGS. 5 and 6), the laser power control is so performed that the laser beam of the target servo-level value supplied from the control unit 16 is irradiated (S204). Consequently, when a pulse of the write level or servo level is not continuously outputted for a period of time longer than the predetermined servo period (sample period) ST, the servo-off pulse SSP1 or the servo-on pulse SSP2 is forcibly inserted in the manner mentioned above, irrespective of the contents of the image data. Thus the laser power control can be performed for each level.

It is preferable that the time at which the servo-off pulse SSP1 or the servo-on pulse SSP2 is inserted be as short as possible in such a range that the laser power control can be performed without any trouble. Since the insertion time is set very short, the formation of the visible image is barely affected, thus performing the above-mentioned servo operation.

Figure 8:
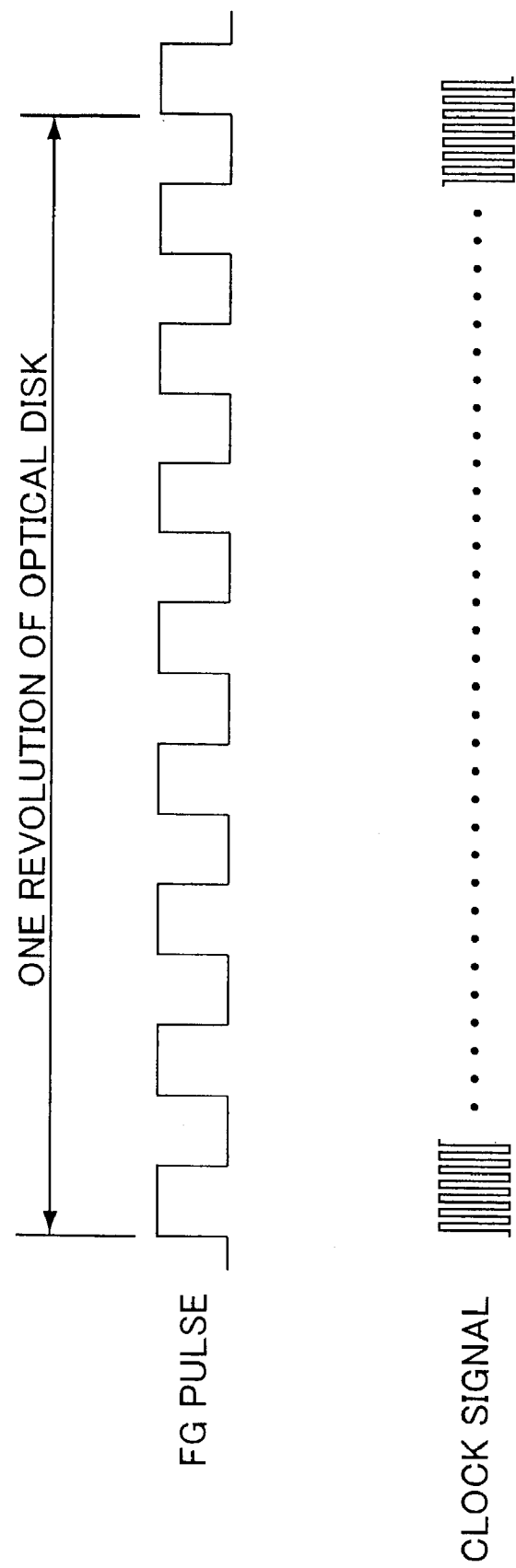
FIG. 8 is a diagram showing FG pulses generated according to the amount of rotation of a spindle motor by a frequency generator as a component of the optical disk recording/reproducing apparatus, and a clock signal generated based on the FG pulses.

Returning to FIG. 2, the PLL circuit 33 multiplies the FG pulse signal of a frequency supplied from the frequency generator 21 as corresponding to the RPM of the spindle motor 11 to output a clock signal used for formation of the visible image as described later. The frequency generator 21 outputs the FG pulse signal of the frequency corresponding to the RPM of the spindle motor 11 using counter-electromotive current obtained by the motor driver of the spindle motor 11. For example, as shown in the upper side of FIG. 8, if the frequency generator 21 generates eight FG pulses during one turn of the spindle motor 11, that is, during one turn of the optical disk D, the PLL circuit 33 outputs a clock signal obtained by multiplying the FG pulses (e.g., a frequency five times the FG pulse signal, that is, 40 pulses of H level during one turn of the optical disk D). In other words, it outputs the clock signal of a frequency corresponding to the rotational speed of the optical disk D rotated by the spindle motor 11. The clock signal thus obtained by multiplying the FG pulse signal is outputted from the PLL circuit 33 to the FIFO memory 34. Then, data indicating the gradient at a coordinate point is outputted from the FIFO memory 34 to the driving pulse generator 35 in each cycle of the clock signal, that is, each time the disk D is rotated to a fixed angle. Although the PLL circuit 33 is used to multiply the FG pulses and generate the clock signal, if a motor having sufficiently stable driving power is used as the spindle motor 11, a crystal oscillator may be provided instead of the PLL circuit 33 to multiply the FG pulses and generate the clock signal, that is, the clock signal of a frequency corresponding to the rotational speed of the optical disk D.

The stepping motor 30 is an actuator for moving the optical pickup 10 in the radial direction of the optical disk D set in the optical disk apparatrus. The motor driver 31 drives the stepping motor 30 to run by an amount corresponding to the pulse signal supplied from the motor controller 32. The motor controller 32 generates a pulse signal according to the traveling direction and the amount of travel of the optical pickup 10 in the direction of the radius of the optical disk D in accordance with travel start instructions, including the moving direction and the amount of travel, from the control unit 16. Then the motor controller 32 outputs the generated pulse signal to the motor driver 31. The stepping motor 30 moves the optical pickup 10 in the radial direction of the optical disk D, while the spindle motor 11 rotates the optical disk D. It allows the optical pickup 10 to change its irradiation position of laser beam to various positions.

The control unit 16 is constituted of a CPU (Central Processing Unit), a ROM (Read Only Memory), a RAM (Random Access Memory), and the like. The control unit 16 controls each part of the optical disk recording/reproducing apparatus 100 according to a program stored in the ROM to centrally control recording on the recording face of the optical disk D and image formation on the thermo-sensitive face of the optical disk D including focus control characteristic of the present invention.

The above describes the structure of the optical disk recording/reproducing apparatus 100 according to the embodiment of the present invention.

B. Operation of Embodiment

Figure 9:
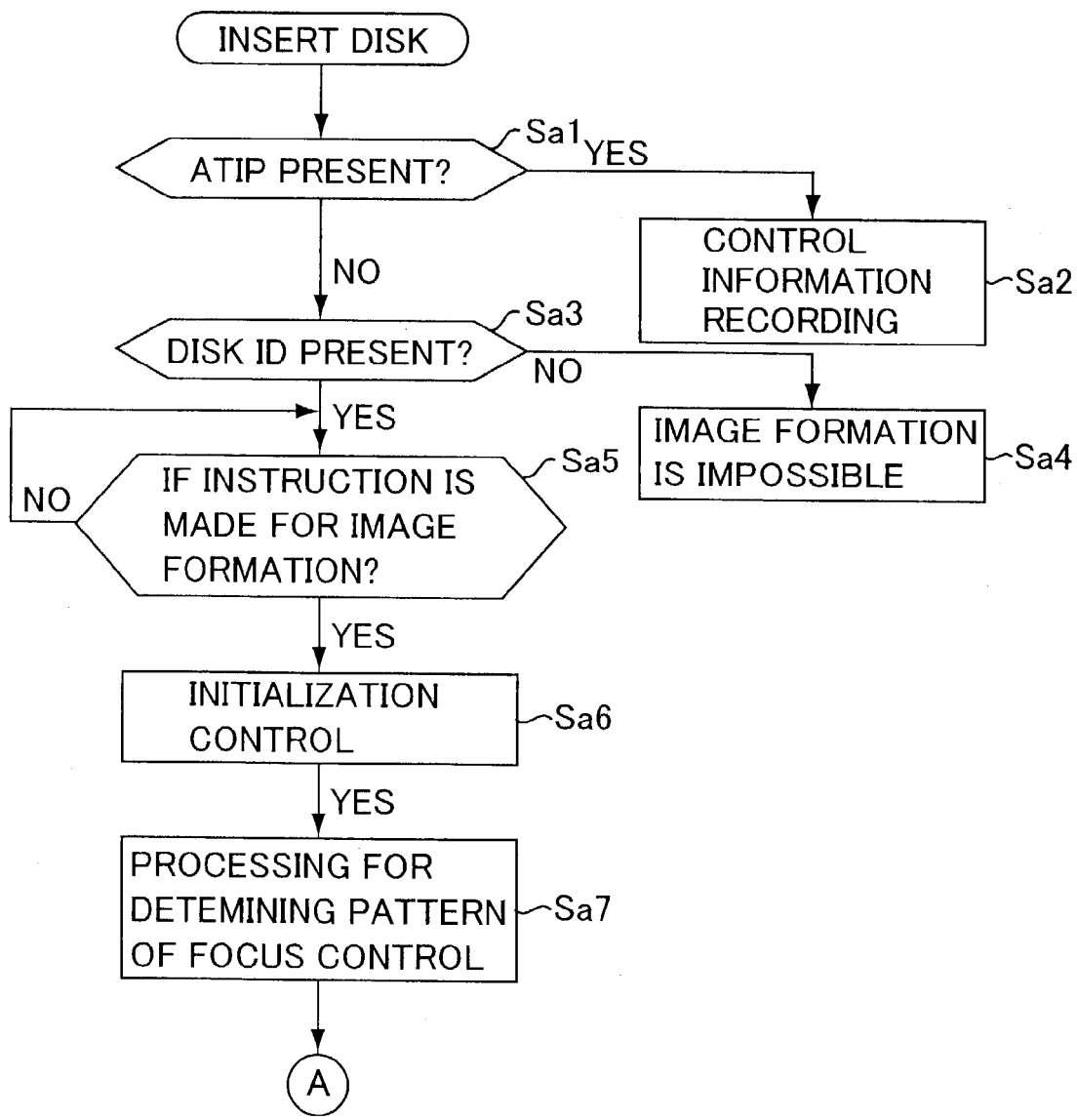
FIG. 9 is a flowchart for explaining the operation of the optical disk recording/reproducing apparatus.
Figure 10:
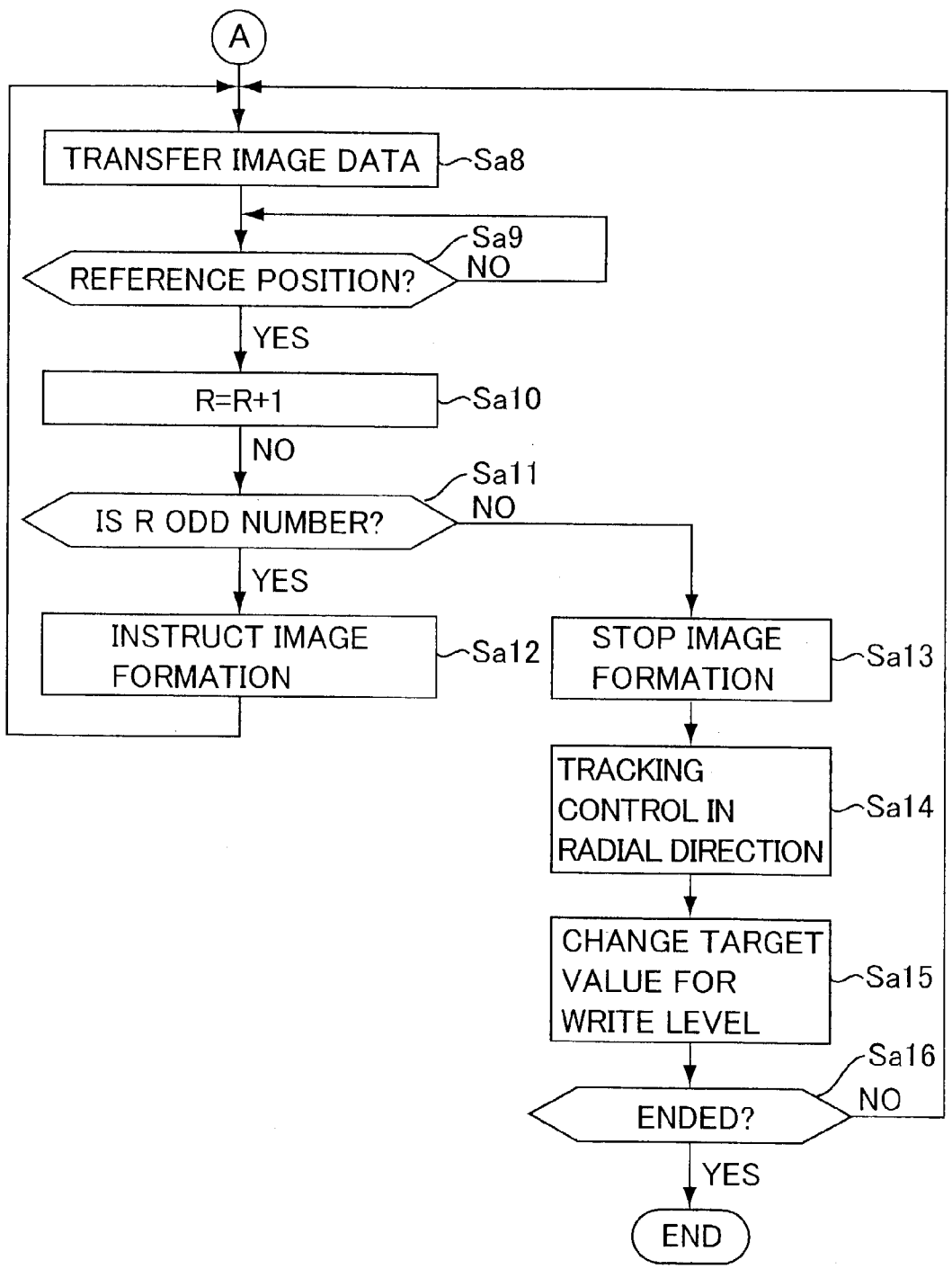
FIG. 10 is a flowchart for explaining the operation of the optical disk recording/reproducing apparatus.

The operation of the optical disk recording/reproducing apparatus 100 will be described next. As described above, the optical disk recording/reproducing apparatus 100 can record, on the recording face of the optical disk D, information such as music data supplied from the host PC 110, and form, on the thermo-sensitive face of the optical disk D, a visible image corresponding to image data supplied from the host PC 110. Referring to FIGS. 9 and 10, the operation of the optical disk recording/reproducing apparatus 100 capable of information recording and formation of a visible image will be described below.

At fist, when the optical disk D is set in the optical disk recording/reproducing apparatus 100, the control unit 16 controls the optical pickup 10 and the like to detect whether ATIP (Absolute Time In Pregroove) information is recorded on the optical disk D of the side facing the optical pickup 10 (step Sa1). It is common knowledge that the ATIP information is information prerecorded in the pregroove on the recording face of a CD-R. When the ATIP information is recorded, it shows that the recording face of the optical disk D is set to face the optical pickup 10. On the other hand, when the ATIP information is not recorded, it shows that the thermo-sensitive face of the optical disk D is set to face the optical pickup 10. In other words, the control unit 16 detects the presence or absence of the ATIP information to detect which side of the optical disk D is set to face the optical pickup 10. Instead of the method of detecting which side is set to face the optical pickup 10 by detecting the presence or absence of the ATIP information, any other method may be used. For example, the user may input that the thermo-sensitive face has been set to face the optical pickup 10.

When detecting the ATIP information from the optical disk D, the control unit 16 determines that the optical disk D is so set that the recording face faces the optical pickup 10, and performs control for recording, on the recording face, recording data supplied from the host PC 110 (step Sa2). The control for recording the recording data is carried out in the same manner as in the conventional optical disk recording/reproducing apparatus (CD-R drive unit). In addition, the focus control is also normal feedback control based on return light. Therefore, the descriptions of these control operations will be omitted.

Figure 11:
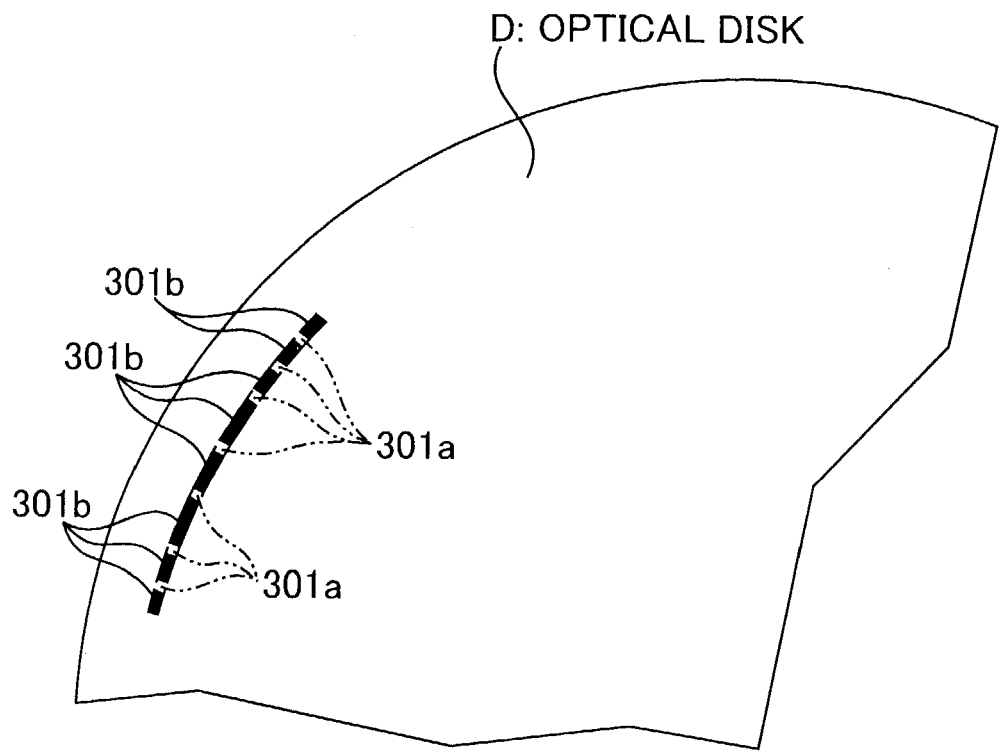
FIG. 11 is a diagram showing a disk ID recorded on the thermo-sensitive face of the optical disk.

On the other hand, when not detecting the ATIP information from the optical disk D, the control unit 16 determines that the thermo-sensitive face is set to face the optical pickup 10, and then determines whether a disk ID of the optical disk D can be acquired (step Sa3). In the embodiment, the disk ID of the optical disk D is a disk ID recorded on the thermo-sensitive face of the optical disk D that has the recording face and the thermo-sensitive face (see FIG. 1). For example, as shown in FIG. 11, a visible image corresponding to coded information on the disk ID is described around the circumference of the outermost circular portion on the thermo-sensitive face of the optical disk D. In the embodiment, as shown, reflecting areas 301a with lengths corresponding to respective pieces of the code and non-reflecting areas 301b are formed around the circumference of the outermost circular portion to describe the disk ID on the thermo-sensitive face of the optical disk D. The control unit 16 traces the irradiation positions of the laser beam from the optical pickup 10 around the circumference of the outermost circular portion of the optical disk D to acquire the disk ID from the reflected light.

If the reflecting areas 301a and the non-reflecting areas 301b corresponding to the disk ID are not formed in the outermost circular portion of the thermo-sensitive face, the optical disk D can be judged to be a common optical disk (such as a CD-R) having no thermo-sensitive face. When cannot acquire the disk ID, the control unit 16 determines that the optical disk D is incapable of forming any visible image (step Sa4) and performs processing such as to inform the user of it.

On the other hand, when acquiring the disk ID from the optical disk D, the control unit 16 waits for instructions for image formation including image data from the host PC 110 (step Sa5). Upon receipt of the instructions for image formation, the control unit 16 performs initialization control for forming a visible image on the thermo-sensitive face of the optical disk D (step Sa6). To be more specific, the control unit 16 controls the servo circuit 13 to drive the spindle motor 11 to run at a predetermined angular speed.

After completion of the initialization control, the control unit 16 performs processing for determining the process pattern of focus control to be performed at the time of irradiation of laser beam for image formation (step Sa7). In the processing for determining the process pattern of focus control, the control unit 16 performs test irradiation to decide the process pattern of focus control. To conduct the test irradiation, the control unit 16 sends an instruction to the motor controller 32 to move the optical pickup 10 so that the laser beam will be irradiated to the innermost circular round area Da of the optical disk D shown in FIG. 12, and drives the stepping motor 30. Unlike the recording face, the reflectivity of the thermo-sensitive face of the optical disk D is normally low. However, this optical disk D is designed such that the innermost circular area Da and the outermost circular area Db have high reflectivity, and in order to perform the test irradiation of laser beam to these round areas, the irradiation position of laser beam from the optical pickup 10 is moved first to the innermost round area Da in the manner mentioned above.

After moving the position of the optical pickup 10 as mentioned above, the control unit 16 instructs the optical pickup 10 to conduct test irradiation of laser beam during one turn of the optical disk D. The control unit 16 also instructs the servo circuit 13 to perform focus control based on the return light, that is, normal focus control when the laser beam is thus irradiated during one turn of the optical disk D.

The control unit 16 acquires the contents of the focus control performed by the servo circuit 13 based on the return light received during one turn of the optical disk D. The control unit 16 then stores the actual contents of the focus control, that is, the contents of the focus control obtained by changing the variable of the focus actuator by a predetermined amount, in the RAM or the like in synchronization with the clock signal supplied from the PLL circuit 33.

Figure 13:
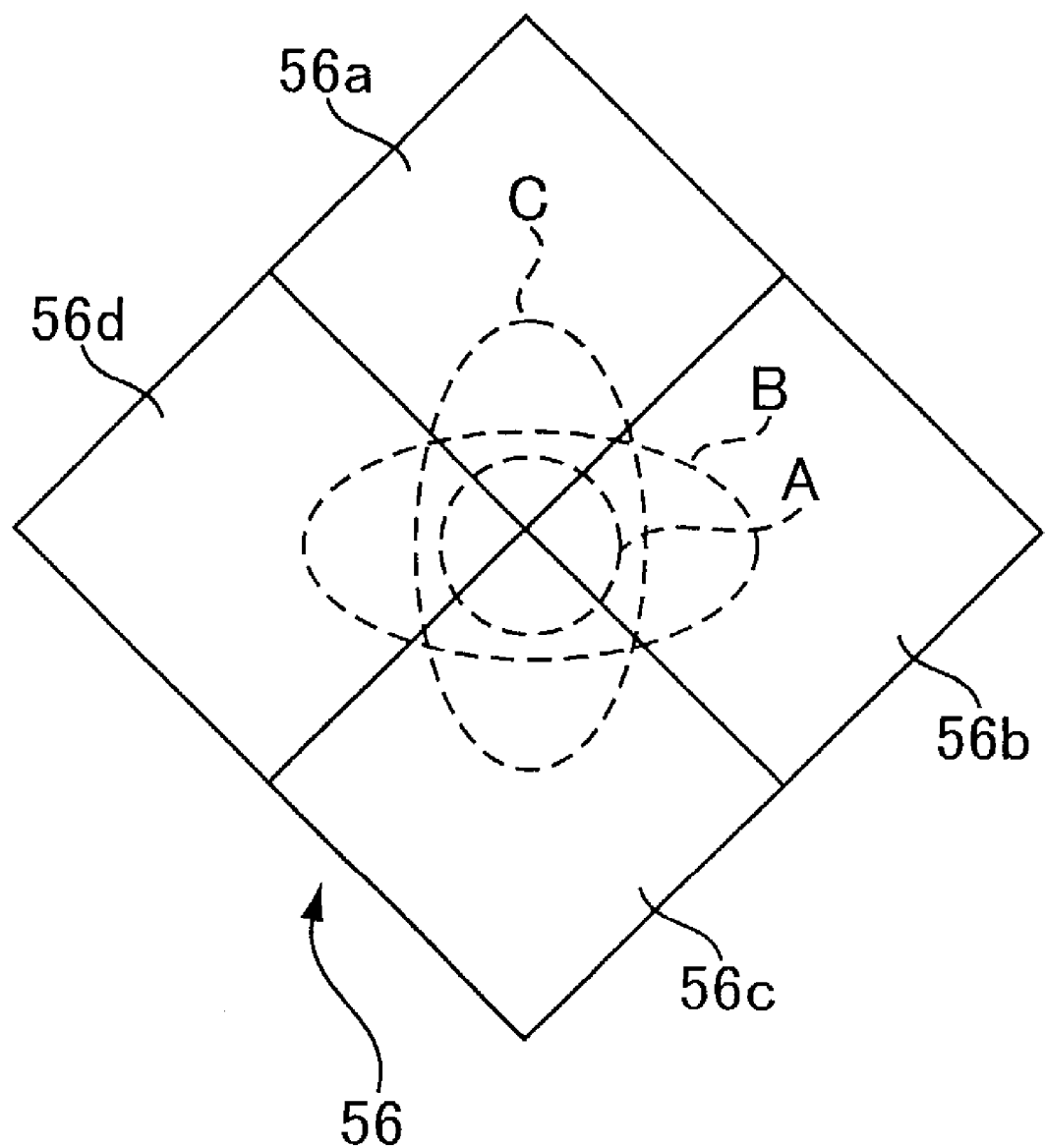
FIG. 13 is a diagram showing a spot shape of return light of laser beam received by a light-receiving element of the optical pickup of the optical disk recording/reproducing apparatus.
Figure 14:
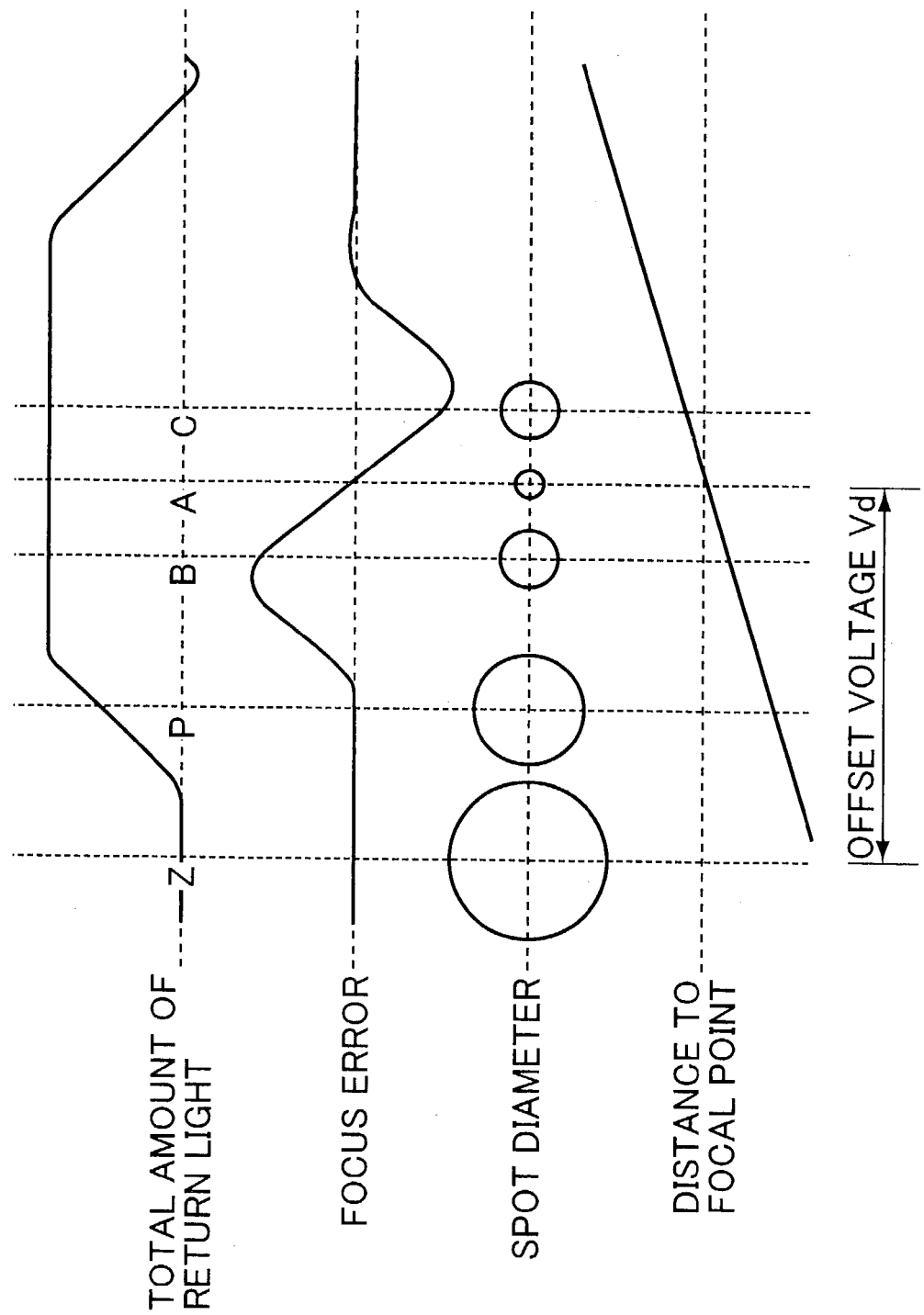
FIG. 14 is a diagram for explaining a process pattern of focus control adapted in the optical disk recording/reproducing apparatus.

To be more specific, as shown in FIG. 13, the focus control at the time of the test irradiation is performed based on a signal outputted from the light-receiving element 56 of the optical pickup 10 using an astigmatic method like normal feedback focus control. In other words, the servo circuit 13 drives the focus actuator 64 (see FIG. 3) so that a circular spot of return light will be received at the center of four areas 56a, 56b, 56c, and 56d of the light-receiving element 56 as shown in FIG. 13 (A in the figure). If the amount of light received on each area 56a, 56b, 56c, or 56d is a, b, c, or d, the driving amount of the focus actuator 64 (driving voltage applied to the actuator) is so controlled that the focus error determined from (a+c)−(b+d) becomes zero. In this case, like the normal feedback focus control, the driving amount of the focus actuator 64 is so determined that spot A shown in FIGS. 13 and 14 is received (that is, a beam of the smallest spot diameter is irradiated on the optical disk D).

The rated contents of the focus control obtained by changing the origins contents of the focus control by a predetermined amount during one turn of the optical disk D are stored in a storage area as a process pattern of inner focus control in the RAM in synchronization with each clock pulse of the clock signal generated by the PLL circuit 33 during one turn of the optical disk D. In other words, as schematically shown as dot-dash line in FIG. 15, the rated or adjusted contents of the focus control (actuator driving voltage) obtained by reduing the original contents of the focus control actually performed each time each clock pulse of the clock signal is generated are stored in association with the clock pulse. Although the figure shows 16 clock pulses for the sake of simplification, the number of clock pulses is not limited to this number. Further, when stored, the contents of the focus control may not be necessarily associated with all the clock pulses generated. For example, the contents of the focus control may be stored in association with a clock pulse at constant intervals of clock pulses (or FG pulses) such as every three or four clock pulses.

Since the clock pulses of the clock signal are pulses obtained by multiplying the FG pulses supplied from the frequency generator 21, they are generated each time the optical disk D is rotated by a predetermined angular amount. For example, if the number of clock pulses generated during one turn of the optical disk D is 360, one clock pulse is generated each time the optical disk D is rotated one degree. In other words, the above-mentioned contents of the focus control are stored as one round process pattern of the focus control in association with clock pulses every predetermined amount of rotation (e.g., one degree) of the optical disk D.

As mentioned above, the contents of the focus control stored in the storage area for inner focus control are the process pattern of focus control with a predetermined amount of adjustment, not the original contents of the focus control performed at the time of the test irradiation of the laser beam. Referring next to FIG. 14, a description will be made of the predetermined adjective amount. As shown, the focus control performed at the time of the test irradiation of the laser beam is to control the laser beam irradiated on the face of the optical disk D, in the same manner as normal focus control, so that the spot diameter will be the smallest. On the other hand, when a visible image is formed on the thermo-sensitive face of the optical disk D, the optical disk recording/reproducing apparatus 100 of the embodiment performs such focus control that the thermo-sensitive face is irradiated with laser beam whose spot diameter is larger than that irradiated at the time of information recording on the recording face. To be more specific, the focus control is so performed that the spot diameter Z shown in FIG. 14 can be obtained for the image formation. For this reason, a focus actuator driving voltage obtained by adjusting the original focus actuator driving voltage as the original contents of the focus control actually performed in the manner mentioned above is stored as the process pattern of the focus control for the image formation. The adjustment or correction is made to compensate for a predetermined offset voltage Vd.

The focus control is performed according to the process pattern of the focus control thus stored. Upon formation of a visible image, laser beam of a spot diameter larger than those of the normal recording and reading is irradiated on the thermo-sensitive face. When the visible image is formed on the thermo-sensitive face of the optical disk D in the manner mentioned above, since laser beam of a spot diameter larger than that at the time of information recording on the recording face is irradiated, the following effects can be obtained. In the embodiment, even when the visible image is formed, laser beam is irradiated while rotating the optical disk D in the same manner when information is recorded on the recording face. Therefore, setting the spot diameter of the laser beam large makes it possible to form the visible image over the entire area of the thermo-sensitive face of the optical disk D in a shorter time. The reason for this will be described with reference to FIG. 16. As schematically shown, a comparison between large and small beam spot diameters BS of laser beam shows that the area of a target area for image formation during one turn of the optical disk D becomes large when the beam spot diameter BS is large. This means that when the beam spot diameter BS is small, the optical disk D needs to be rotated about more turns in order to cover the entire area for the image formation (in the figure, four turns when BS is large and six turns when BS is small), and it takes longer time for the image formation. For such a reason, upon formation of a visible image, the optical disk recording/reproducing apparatus 100 irradiates laser beam of a spot diameter larger than that at the time of information recording.

As mentioned above, the test irradiation of the laser beam to the innermost circular area Da of the optical disk D is performed, and the contents of the focus control are stored in the storage area for the round process pattern of inner focus control in the RAM in association with the clock pulses. After that, the control unit 16 sends an instruction to the motor controller 32 to move the optical pickup 10 so that the laser beam will be irradiated to the outermost circular area Db of the optical disk D shown in FIG. 12, and drives the stepping motor 30.

Figure 12:
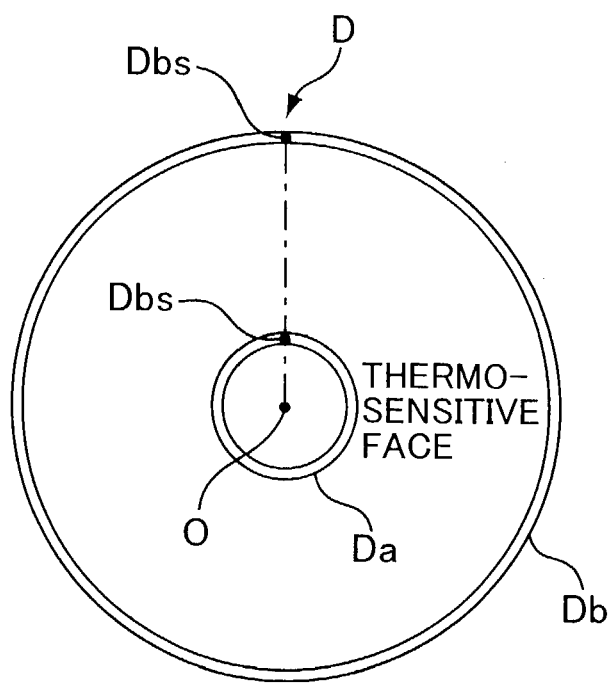
FIG. 12 is a diagram showing the area structure of the thermo-sensitive face of the optical disk.

After that, the control unit 16 instructs the optical pickup 10 to perform test irradiation of laser beam during one turn of the optical disk D in the same manner as the test irradiation to the area Da of the optical disk D. The control unit 16 also instructs the servo circuit 13 to perform focus control based on the return light, that is, normal feedback focus control when the laser beam is thus irradiated during one turn of the optical disk D. When the laser beam is irradiated to the outermost circular area Db, the control unit 16 instructs the optical pickup 10 to start irradiation of the laser beam from position Dbs corresponding to position Das from which the irradiation of the laser beam to the innermost circular area Da was started. In other words, as shown in FIG. 12, it instructs the start of irradiation of the laser beam from the position Dbs of the area Db. Here, the position Dbs and the position Das from which the irradiation of the laser beam to the innermost circular area Da was started are on the same line drawn from the center O of the optical disk D in the radial direction. In this specification, such a position on the same line is called a reference position, and the FG pulses are counted to detect whether the irradiation position of the laser beam has passed the reference position. For example, if the number of FG pulses for one turn of the optical disk D is eight, the point at a time when the count of eight FG pulses has reached after the irradiation of the laser beam to the innermost circular area Da was started becomes the timing of passing the reference position. Next, the point at a time when the count of 16 FG pulses has reached also becomes the timing of passing the reference position. Similarly, the point at the time when the count of 8n FG pulses (where n is an integear number) has reached becomes the timing of passing the reference position. Thus, the irradiation of the laser beam to the outermost circular area Db can be started at this timing.

Then, the control unit 16 stores the adjusted contents of the focus control (shown as dash line in FIG. 15) obtained by reducing the original contents of the focus control actually performed when the laser beam was irradiated to the outermost circular area Db of the optical disk D, that is, by changing the controlled variable of the focus actuator by an amount. The adjusted contents of the focus control thus obtained are stored in a storage area for the one round process pattern of outer focus control in the RAM in synchronization with the clock signal supplied from the PLL circuit 33.

After completion of the processing for determining the process patterns of the focus control mentioned above, processing for forming the visible image on the thermo-sensitive face of the optical disk D is performed. As shown in FIG. 11, the control unit 16 transfers to the FIFO memory 34 the image data supplied from the host PC 110 through the buffer memory 36 (step Sa8). Then, the control unit 16 determines, from the FG pulse signal supplied from the frequency generator 21, whether a predetermined reference position of the optical disk D rotated by the spindle motor 11 has passed the irradiation position of the laser beam from the optical pickup 10 (step Sa9). As mentioned above, the count of FG pulses is started from the point in time when the irradiation of the laser beam to the innermost circular area Da was started to detect whether the reference position (see FIG. 12) has passed the irradiation position of the laser beam.

When detecting that the reference position of the optical disk D has passed the irradiation position of the laser beam after receiving the instructions for image formation from the host PC 110 and completing the processing for deciding the contents of the focus control, the control unit 16 increments variable R indicating the number of rotations by one (step Sa10), and determines whether R is an odd number (step Sa11).

Figure 17:
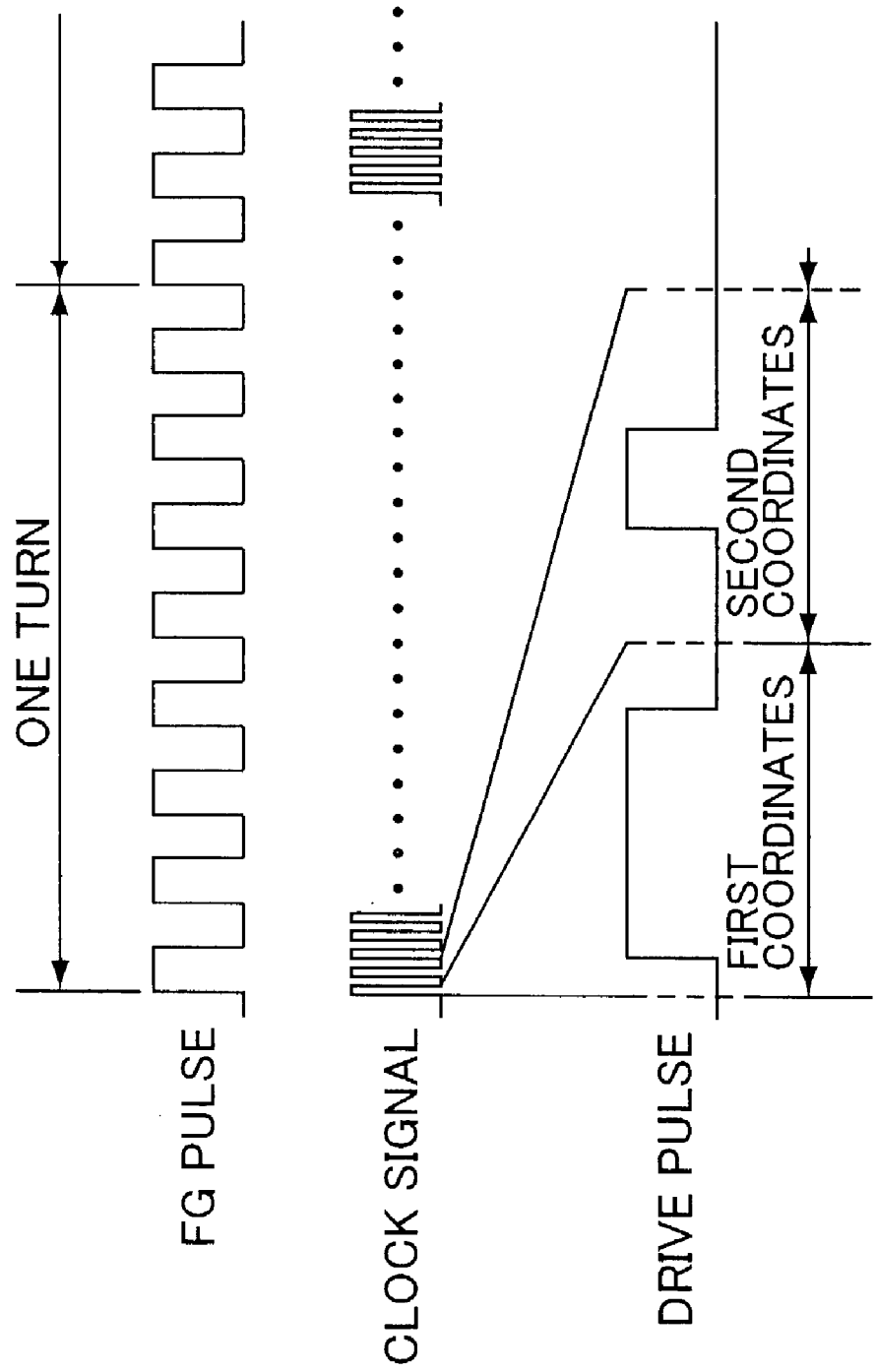
FIG. 17 is a timing chart for explaining the operation of the optical disk recording/reproducing apparatus when irradiating a laser beam on the thermo-sensitive face of the optical disk to form a visible image.
Figure 18:
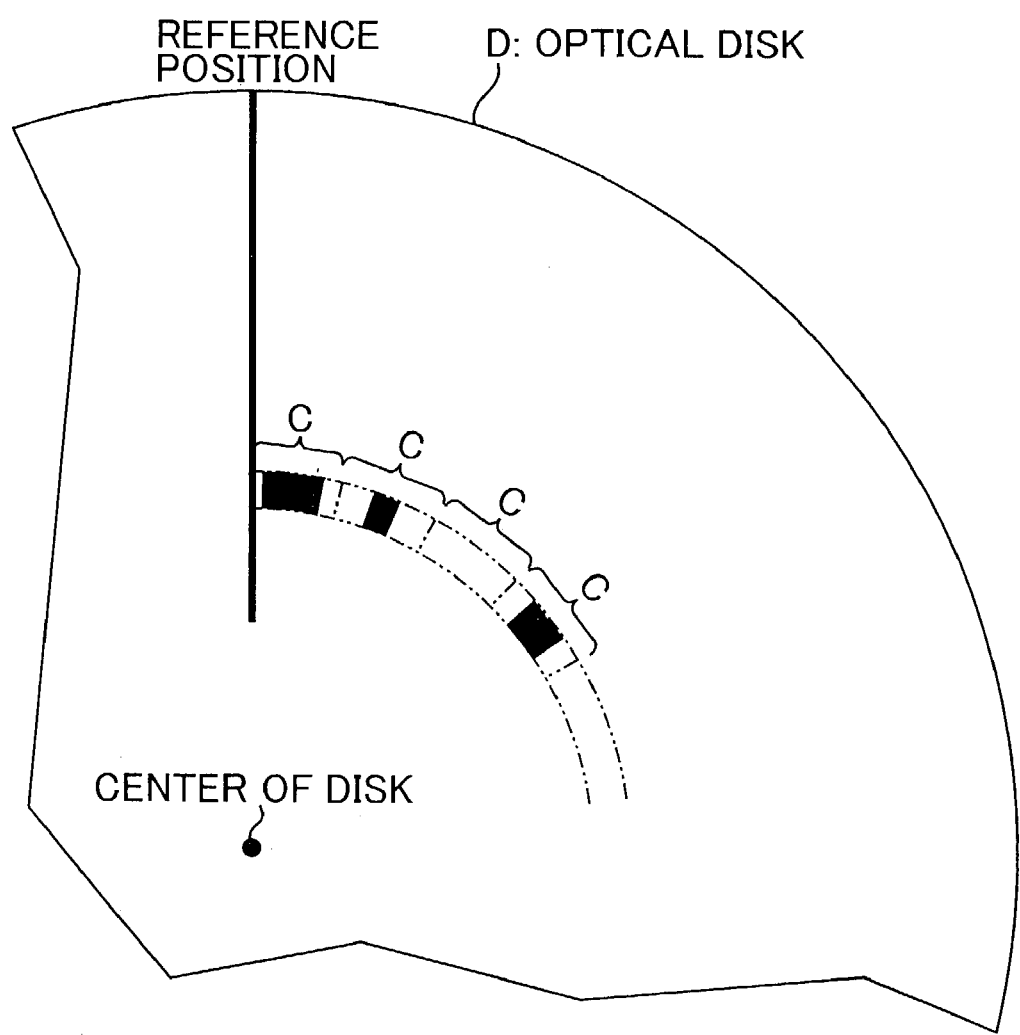
FIG. 18 is a diagram showing the thermo-sensitive face of the optical disk after irradiated with laser beam by the optical disk recording/reproducing apparatus.

After completion of the processing for deciding the contents of the focus control, when the control unit 16 detects that the reference position has been passed for the first time, R=0 (initial value)+1=1. In this case, it is determined in step Sa10 that R is an odd number. When determining that R is an odd number, the control unit 16 controls the optical pickup 10 to irradiate the laser beam on the thermo-sensitive face of the optical disk D and form the visible image (step Sa12). To be more specific, from the point in time when receiving a pulse for detecting the reference position, the control unit 16 starts control of each part to output the image data sequentially from the FIFO memory 34 in synchronization with the clock signal outputted from the PLL circuit 33. As shown in FIG. 17, the FIFO memory 34 under control outputs information indicative of the gradient at a coordinate point to the driving pulse generator 35 each time each clock pulse is supplied from the PLL circuit 33. The driving pulse generator 35 generates a driving pulse of a pulse width determined according to the gradient indicated in the information, and outputs the driving pulse to the laser driver 19. As a result, the optical pickup 10 irradiates laser beam at the write level on the thermo-sensitive face of the optical disk D for a period of time corresponding to the gradient at each coordinate point to discolor the irradiated area. Thus the visible image as shown in FIG. 18 can be formed.

As schematically shown, since the optical disk D is rotated by the spindle motor 11, the irradiation position of the laser beam from the optical pickup 10 is moved around the circumference by an area, indicated with "C" in the figure, in one cycle of the clock signal (for a period from rising timing of a pulse until rising timing of the next pulse). The period of time during which the laser beam must be irradiated at the write level while passing the area C is varied according to the gradient in the manner mentioned above, so that the disclosed area can be varied in each area C according to the gradients different among the areas. Thus, since the irradiation time of the laser beam when passing each area C is controlled according to the gradient at each coordinate point, the visible image corresponding to the image data can be formed on the thermo-sensitive face of the optical disk D.

When the laser beam is irradiated for image formation, open-loop focus control according to the process patterns of the focus control stored in the RAM by the processing for determining the process patterns of the focus control, rather than the closed-loop focus control based on the return light from the thermo-sensitive face, is performed. In other words, the control unit 16 decides the amount of focus control based on the process patterns of the focus control determined as mentioned above and the irradiation position of the laser beam from the optical pickup 10 in the radial direction to control the focus actuator 64 through the servo circuit 13.

To be more specific, the control unit 16 decides the amount of focus control V after the process patterns of the focus control in response to positional information indicated by counts of clock pulse from the reference position each detected one by one during the image formation period. Namely, the focus control is performed according to rotation amount information $\theta$ indicating the angular amount of rotation from the reference position, position information r indicating the irradiation position in the radial direction, and the contents of the focus control stored in the RAM. The amount of focus control V is determined according to the following equation:

$$V = df \times \{fin(r) \times in(\theta) + fout(r) \times out(\theta)\}$$

Figure 15:
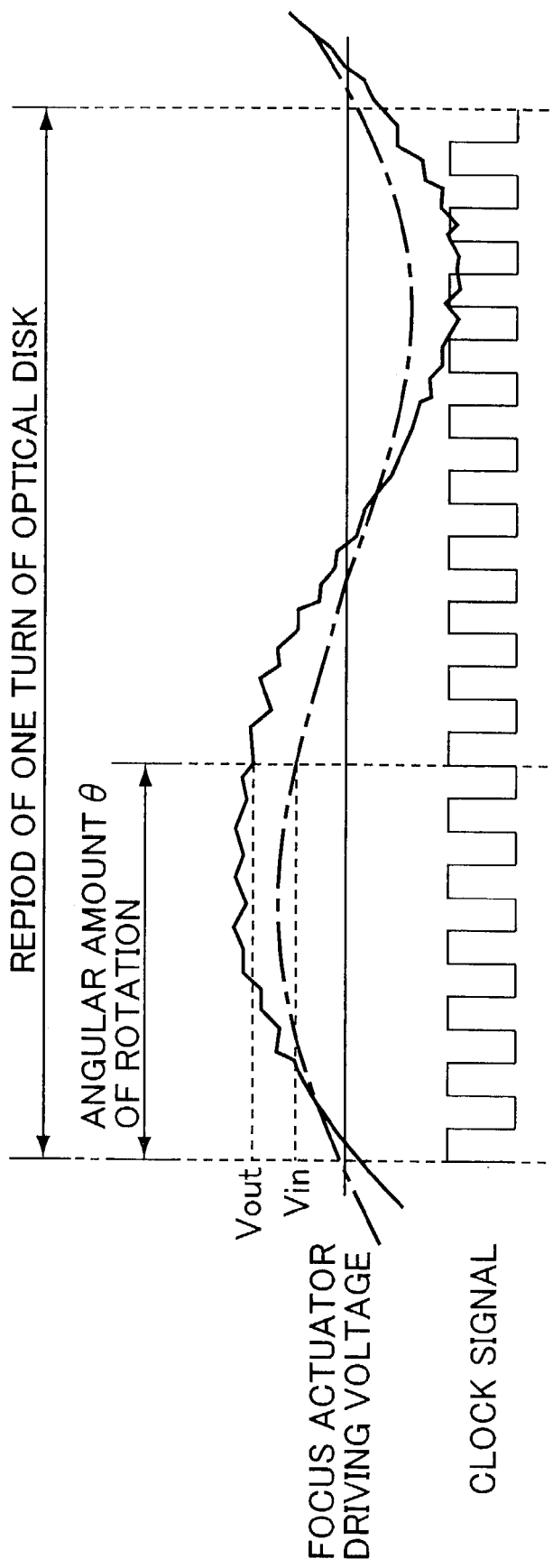
FIG. 15 is a diagram for explaining a method of deriving the process pattern of focus control determined by test irradiation performed by the optical disk recording/reproducing apparatus.

In the above equation, df is the ratio of defocus distribution, and it is a fixed value, for example, 0.8. fin(r) is a predetermined function, and fout(r) is also a predetermined function. It is determined which of, the inner focus control pattern and the outer focus control pattern is more reflected in the focus control contents, depending on what kinds of functions are employed as these functions. For example, if the ratio of contribution between the inner and outer round process patterns is determined in a proportional manner simply according to the position r in the radial direction, fin(r)=(R−r)/R and fout(r)=r/R, where R is the radius of the disk D. Further, in($\theta$) represents the inner focus control pattern determined as mentioned above and stored in association with each clock pulse corresponding to the rotation amount $\theta$. Similarly, out($\theta$) represents the outer focus control pattern and is stored in association with each clock pulse corresponding to the rotation amount $\theta$. If the rotation amount $\theta$ from the reference position corresponds to the seventh clock pulse from the reference position as shown in FIG. 15, in($\theta$) is Vin and out($\theta$) is Vout.

The control unit 16 controls the focus actuator 64 through the servo circuit 13 so that the focus control will be performed according to the focus control amount V derived each time a clock pulse is supplied in the manner mentioned above (that is, each time $\theta$ incrementally varies). This control makes it possible to irradiate the thermo-sensitive face of the optical disk D with laser beam of a large spot diameter as mentioned above (see FIG. 16), and hence to achieve faster image formation processing.

Upon execution of the control sequence for forming the visible image by the irradiation of the laser beam controlled according to the image data, the control unit 16 returns to step Sa8 and transfers the image data from the buffer memory 36 to the FIFO memory 34. Then, the control unit 16 detects whether the irradiation position of the laser beam from the optical pickup 10 has passed the reference position of the optical disk D (step Sa9). When detecting that it has passed the reference position, the control unit 16 increments R by one (step Sa10). As a result, if R becomes an even number, the control unit 16 controls each part of the device to stop the formation of the visible image by the irradiation control of the laser beam (step Sa13). To be more specific, the control unit 16 controls the FIFO memory 34 not to output the information indicative of the gradient at each coordinate point to the driving pulse generator 35 in synchronization with the clock signal supplied from the PLL circuit 33. In other words, after irradiating the thermo-sensitive face of the optical disk D with the laser beam of the write level and completing the formation of the visible image, the control unit 16 performs such control that the irradiation of the laser beam for discoloring the thermo-sensitive face will not be performed during the next turn of the optical disk D.

When stopping the irradiation of the laser beam for the formation of the visible image, the control unit 16 instructs the motor controller 32 to move the optical pickup 10 by a predetermined amount to the outer side in the radial direction (step Sa14). The motor controller 32 follows the instruction and drives the stepping motor 30 through the motor driver 31 to move the optical pickup 10 to the outer side by the predetermined amount.

The predetermined amount by which the optical pickup 10 is moved in the radial direction of the optical disk D may be determined properly according to the spot diameter BS (see FIG. 16) of the beam irradiated from the optical pickup 10. In other words, when the visible image is formed on the thermo-sensitive face of the disk-shaped optical disk D, the irradiation position of the laser beam from the optical pickup 10 is moved with almost no space on the face of the optical disk D. Such a minute movement is required to realize image formation with higher quality. Therefore, if the unit amount of travel of the optical pickup 10 in the radial direction is set to almost the same length as the beam spot diameter BS of the laser beam irradiated on the optical disk D, the laser beam can be irradiated with almost no space on the face of the optical disk D. This makes possible image formation with higher quality. However, there is a case that an area larger than the spot diameter of the irradiated beam is discolored due to various reasons such as the properties of the thermo-sensitive face. In such a case, the width of the unit amount of travel may be determined by allowing for the width of the discolored area so that adjacent discolored areas will not be overlapped. In the embodiment, since the beam spot diameter BS is set larger than that at the time of recording on the recording face (for example, about 20 μm), the control unit 16 controls the motor controller 32 to drive the stepping motor 30 to move the optical pickup 10 in the radial direction by a length almost equal to the beam spot diameter BS. Recent stepping motors 30 can employ μ-step technology to control the amount of travel in 10-μm blocks. The use of such a stepping motor 30 can be enough to realize the travel of the optical pickup 10 in the radial direction in 20-μm blocks.

After completion of the control operation for moving the optical pickup 10 in the radial direction by the predetermined amount, the control unit 16 gives the laser power control circuit 20 a target value for write level changed for irradiating laser beam at the write level (step Sa15). In the embodiment, since the CAV method for irradiating the laser beam while rotating the optical disk D with keeping the angular speed constant is employed as the method for forming the visible image, when the pickup 10 is moved to the outer side, the linear speed becomes high. Therefore, when the optical pickup 10 is moved in the radial direction (to the outer side), the target value for write level is changed to be larger than that at that time. In this case, even if the linear speed is changed due to the change of the target value, laser power of intensity enough to discolor the thermo-sensitive face of the optical disk D can be irradiated.

After execution of the control for moving the optical pickup 10 in the radial direction and the control for changing the target value for write level, the control unit 16 determines whether there is unprocessed image data for the formation of the visible image, that is, the image data that has not been supplied to the driving pulse generator 35 yet. If there is no such image data, the processing is ended.

On the other hand, if there is unprocessed image data that has not been supplied to the FIFO memory 34 yet, the procedure returns to step Sa7, and the image formation processing is continued. In other words, the control unit 16 transfers the image data to the FIFO memory 34 (step Sa8), and determines whether the irradiation position of the laser beam has passed the reference position of the optical disk D (step Sa9). Then, if it has passed the reference position, the control unit 16 increments the variable R indicating the number of rotations by one (step Sa10), and determines whether the incremented variable R is an odd number (step Sa11). If R is an odd number, the control unit 16 controls each part of the device so that the laser beam for forming the visible image is irradiated in the manner mentioned above. On the other hand, if R is an even number, the control unit 16 stops the irradiation of the laser beam for forming the visible image (irradiates the laser beam of the servo level). After that, the control unit 16 performs the control for moving the optical pickup 10 in the radial direction and the control for changing the target value for write level. In other words, when irradiating the optical disk D with the laser beam for image formation (including the irradiation at the write level) in a certain rotation cycle, the control unit 16 controls not to irradiate the laser beam for image formation in the next rotation cycle, and performs the control for moving the optical pickup 10 in the radial direction in that rotation cycle. The control for moving the optical pickup 10 and the control for changing the target value for write level are executed in that rotation cycle, during which image formation is not performed. As a result, any image cannot be formed while the irradiation position and the power value of the laser beam to be irradiated are varying in the progress of the control processing, and the irradiation of the laser beam for image formation can be performed after the irradiation position and intensity of the laser beam are stabilized. This can prevent a reduction in the quality of the visible image formed with the control operation such as to move the optical pickup 10 in the radial direction.

The above describes the main operation of the optical disk recording/reproducing apparatus 100 according to the embodiment. The optical disk recording/reproducing apparatus 100 can use each part of the device such as the optical pickup 10 for performing information recording on the recording face to the fullest extent to irradiate laser beam on the thermo-sensitive face formed on the optical disk D and form a visible image corresponding to image data without the need to mount additional printing means.

Further, in the embodiment, since the irradiation timing of laser beam is controlled based on a clock signal generated from the FG pulses generated according to the rotation of the spindle motor 11, that is, a clock signal generated according to the amount of rotation of the optical disk D, the irradiation position of the laser beam can be grasped in the optical disk recording/reproducing apparatus 100 without the need to acquire position information or the like from the side of the optical disk D. Therefore, such a limitation that an optical disk D specially processed such as that with a pregroove (guide groove) formed on the thermo-sensitive face has to be used is not imposed on the optical disk recording/reproducing apparatus 100. It allows the optical disk recording/reproducing apparatus 100 to form a visible image corresponding to image data even on the thermo-sensitive face on which a groove or position information is not preformed.

When laser beam is irradiated on the thermo-sensitive face of the optical disk D, since the thermo-sensitive face has low reflectivity, it is difficult to use feedback control based on return light as focus control. If focus control is performed through the application of a predetermined fixed offset voltage or the like to the focus actuator 64, the distance between the optical pickup 10 and the thermo-sensitive face of the optical disk D will vary due to unevenness on the optical disk D or rotational variations to disable accurate focus control. On the other hand, the embodiment performs open-loop focus control according to the pattern of focus control determined based on return light obtained by irradiating laser beam to high-reflective areas (area Da and area Db) beforehand. This makes it possible to perform accurate focus control even when laser beam is irradiated to a low-reflective area such as the thermo-sensitive face.

The distance between the optical pickup 10 and the optical disk D can vary due to rotational variations or the like on the outer side more often than on the inner side. In such a case, the degree of variations in the distance between both is also made different between the inner side and the outer side. When the focus control is performed based on the process pattern of focus control obtained by irradiating laser beam to only the inner area Da or the outer area Db, if the distance between both varies widely between the inner radius and the outer radius, the accuracy of the focus control may be reduced. In contrast, the embodiment uses the process pattern of focus control derived from the contents of the operations of focus control carried out by irradiating laser beam to the inner area Da and the outer area Db, respectively. Further, the embodiment changes the amount of reflection of both according to the irradiation position of the laser beam to decide the final focus control contents, thereby performing more accurate focus control.

C. Modifications

The present invention is not limited to the aforementioned embodiment, and various modifications are possible as illustrated below.

(First Modification)

In the aforementioned embodiment, test laser beam is irradiated to both the inner area Da and the outer area Db, and based on the process pattern of focus control performed during the irradiation of the test laser beam to both areas, the process pattern of focus control performed when laser beam is irradiated to the thermo-sensitive face is determined. Alternatively, the process pattern of focus control may be determined based on the contents of the focus control performed using the return light obtained by irradiating the laser beam to only either the inner area Da or the outer area Db. In the aforementioned embodiment, the inner area Da and the outer area Db, both having high reflectivity, are formed on the thermo-sensitive face of the optical disk D. However, if either of the areas has high reflectivity, the laser beam may be irradiated to only the high-reflective area.

Further, in the aforementioned embodiment, the inner area Da and the outer area Db having high reflectivity are targeted. However, the target area is not limited to the inner or outer area, and any other area may be targeted for the test irradiation of laser beam as long as it is highly reflective enough to obtain return light necessary for accurate focus control.

(Second Modification)

Furthermore, in the aforementioned embodiment, the focus control as described above is performed as the focus control performed when laser beam is irradiated to form a visible image on the thermo-sensitive face opposite the recording face of the optical disk D. However, the same control as in the embodiment can be employed as focus control performed in any other case, for example, when laser beam is irradiated on a label face to read a visible image formed on the other side of the recording face (that is, on the label face). Like the above-mentioned thermo-sensitive face, the label face on which a visible image such as characters or a picture of a music title or the like is depicted can often have reflectivity lower than the recording face. Therefore, the use of the same focus control as that in the aforementioned embodiment when laser beam is irradiated on the label face to read the visible image can make the focus control more accurate.

Figure 19:
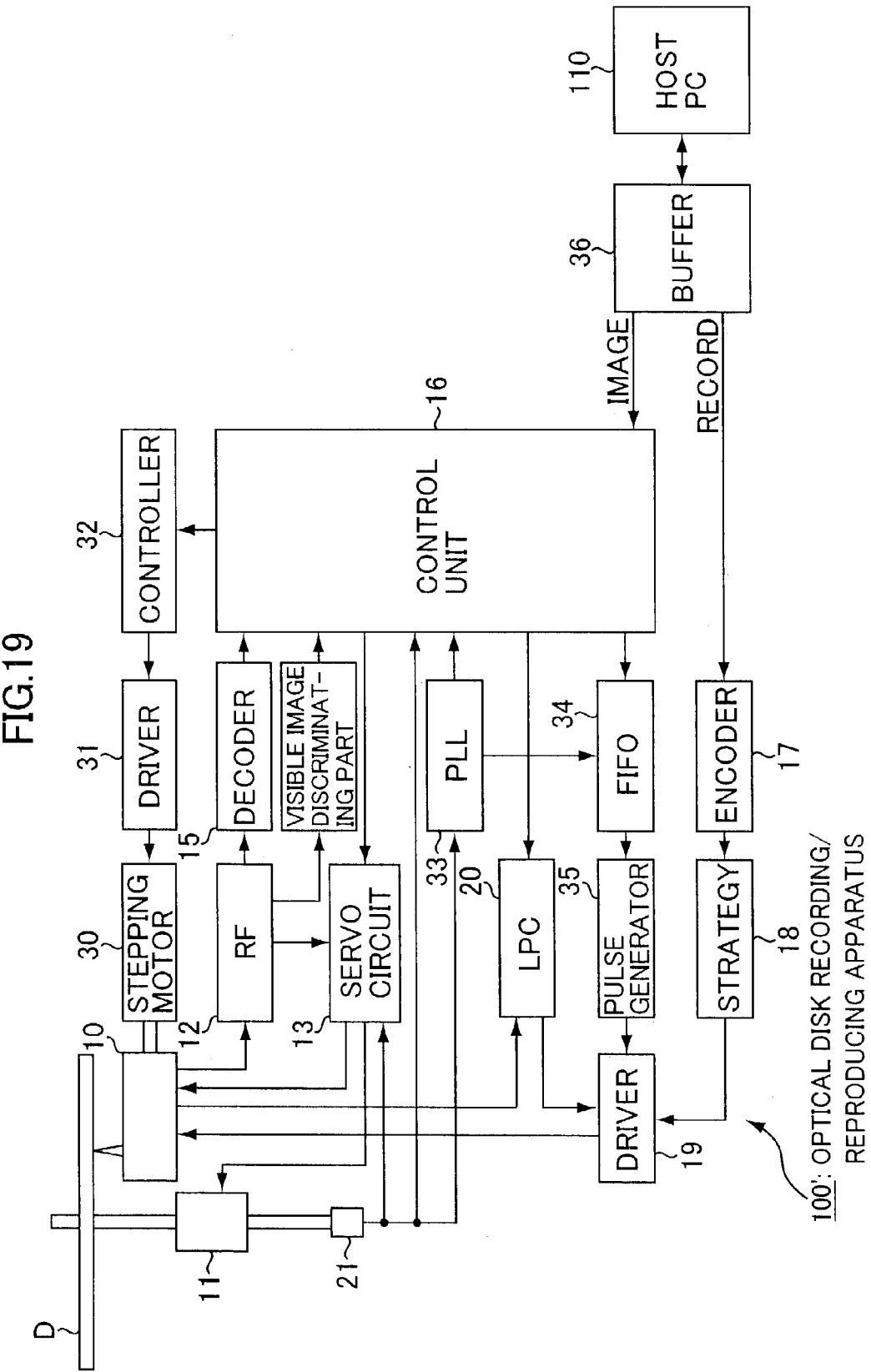
FIG. 19 is a block diagram showing a structure of a modification of the optical disk recording/reproducing apparatus according to the invention.

FIG. 19 shows the structure of an optical disk recording/reproducing apparatus capable of reading a visible image drawn in a low-reflective area such as the label face. As shown, the optical disk recording/reproducing apparatus 100' includes visible image determining part 500 in addition to those of the optical disk recording/reproducing apparatus 100. In this structure, when reading a visible image such as character information or two-dimensional barcode formed on the label face opposite the recording face of the optical disk D, the control unit 16 controls each part of the device such as the optical pickup 10, the servo circuit 13, and the laser power control circuit 20 to irradiate laser beam on the label face in the same manner when reading normal EFM data recorded on the recording face of the optical disk D, except how to perform focus control. Before the irradiation of the laser beam for such reading operation, test irradiation to a high-reflective area (for example, the innermost area) is performed in the same manner as in the aforementioned embodiment. Then, from the contents of the focus control performed in the test irradiation, the process pattern of focus control to be performed when the laser beam is irradiated on the label face is determined, and the focus control is performed according to the determined focus control contents.

In the optical disk recording/reproducing apparatus 100', the return light of the laser beam irradiated on the label face in the manner mentioned above is supplied to the visible image determining part 500 through the RF amplifier 12. The visible image determining part 500 determines whether the level of a signal supplied from the RF amplifier 12 equals or exceeds a predetermined level value, and outputs the determination result to the control unit 16. The control unit 16 determines the level of contrast or tone in an area of the label face on a coordinate basis. This determination is made based on the determination result supplied one by one from the visible image determining part 500, and the position of the laser beam irradiated when each determination result is obtained (that is, the radial position and the angle of rotation from the reference position). Thus the control unit 16 reads the information such as characters drawn on the label face. Even when the amount of reflected light from the label face is relatively small, the above-mentioned determination as to whether the level value of the reflected light exceeds the predetermined value makes it possible to determine whether the area is light (e.g., white area) or dark (e.g., black area). Thus, simple characters, a picture, a barcode, or the like can be read out.

(Third Modification)

Furthermore, in the aforementioned embodiment, the focus control is performed based on the return light received by the light-receiving element 56 having four areas 56*a*, 56*b*, 56*c*, and 56*d*. However, when tracking control using a three-beam method is performed, a light-receiving element having two more light-receiving areas in addition to the four light-receiving areas is used. In an optical disk recording/reproducing apparatus having such a light-receiving element, focus control may be performed based on the return light received by the light-receiving element having the six light-receiving areas to decide the contents of the focus control.

(Fourth Modification)

It is assumed inn the aforementioned embodiment that the optical disk D is a CD-R, and the description is made of the application of the present invention to the optical disk recording/reproducing apparatus for performing recording on and reproduction from the CD-R. However, the present invention may also be applied to an optical disk recording device, reproducing device, recording/reproducing device, or the like capable of data recording on a CD-RW disk, VD-RW disk, DVD-RAM disk, or the like.

(Fifth Modification)

Furthermore, in the aforementioned embodiment, the control unit 16 runs the program stored in the ROM to execute processing including the processing for deciding the process pattern of focus control (step Sa7 in FIG. 9). Alternatively, a special-purpose hardware circuit may be so constructed that the processing will be executed by the hardware circuit. On the other hand, when the processing is executed via software, a program for letting a computer realize the processing may be provided to users in the form of various recording media, such as CD-ROM or floppy disk, or provided to users through a communication network such as the Internet.

As described above, according to the present invention, even when a laser beam is irradiated to an area from which a sufficient amount of reflected light cannot be obtained, accurate focus control can be performed.

What is claimed is:

1. An optical disk apparatus for writing or reading information by irradiating a laser beam onto an optical disk while rotating the optical disk under a focus control of the laser beam relative to the rotated optical disk, the apparatus comprising:

an irradiating section that irradiates the laser beam onto the optical disk;

a determining section that determines a process pattern of the focus control by operating the irradiating section to irradiate the laser beam onto a predetermined area of the optical disk and by monitoring the laser beam reflected back from the predetermined area; and a focusing section that performs the focus control to regulate a spot diameter of the laser beam based on the determined process pattern during either of the writing or reading of information, wherein the determining section operates the irradiating section to irradiate the laser beam along a predetermined round area during at least one turn of the optical disk, and monitors the laser beam reflected back from the predetermined round area so as to determine one round process pattern of the focus control in function of an angular position of the rotated optical disk, and wherein the focusing section performs the focus control based on the determined one round process pattern in response to the angular position of the rotated optical disk.

2. The optical disk apparatus according to claim 1, wherein the determining section determines a process pattern of the focus control based on a first round process pattern obtained from the laser beam reflected back from an innermost round area of the optical disk and a second round process pattern obtained from the laser beam reflected back from an outermost round area of the optical disk.

3. The optical disk apparatus according to claim 2, wherein the determining section determines the process pattern of the focus control by interpolating the first round process pattern and the second round process pattern in terms of a radial position of the laser beam, and wherein the focusing section performs the focus control based on the determined process pattern in response to the radial position of the laser beam.

4. An optical disk apparatus for writing or reading information by irradiating a laser beam onto an optical disk while rotating the optical disk under a focus control of the laser beam relative to the rotated optical disk, the apparatus comprising:

an irradiating section that irradiates the laser beam onto the optical disk;

a determining section that determines a process pattern of the focus control by operating the irradiating section to irradiate the laser beam onto a predetermined area of the optical disk and by monitoring the laser beam reflected back from the predetermined area;

a focusing section that performs the focus control to regulate a spot diameter of the laser beam based on the determined process pattern during either of the writing or reading of information;

a mount section that can rotatably mount an optical disk having a recording face writeable with data information and a thermo-sensitive face opposite to the recording face and writeable with image information; and an image forming section operative when the optical disk is mounted to expose the thermo-sensitive face for operating the irradiating section to irradiate the laser beam onto the thermo-sensitive face to thereby form the image information, wherein the determining section determines the process pattern of the focus control such that the spot diameter of the laser beam irradiated onto the thermo-sensitive face is regulated greater than the spot diameter of the laser beam irradiated onto the recording face.

5. The optical disk apparatus according to claim 4, further comprising a reading section that operates the irradiating section to irradiate the laser beam onto the thermo-sensitive face of the optical disk to read therefrom the image information.

6. A method of focus control of a laser beam relative to an optical disk rotated in an optical disk apparatus for writing or reading information by irradiation of the laser beam onto the rotated optical disk, the method comprising:

provisionally irradiating the laser beam onto a predetermined area of the optical disk;

monitoring the laser beam reflected back from the predetermined area to detect a variation of a spot diameter of the laser beam;

determining a process pattern of the focus control based on the detected variation of the spot diameter;

conducting the irradiation of the laser beam onto the rotated optical disk for writing or reading information; and performing the focus control to regulate a spot diameter of the laser beam based on the determined process pattern during conducting the irradiation of the laser beam, wherein the determining step irradiates the laser beam along a predetermined round area during at least one turn of the optical disk, and monitors the laser beam reflected back from the predetermined round area so as to determine one round process pattern of the focus control in function of an angular position of the rotated optical disk, and the performing step performs the focus control based on the determined one round process pattern in response to the angular position of the rotated optical disk.

7. The method according to claim 6, wherein the determining step determines a process pattern of the focus control based on a first round process pattern obtained from the laser beam reflected back from an innermost round area of the optical disk and a second round process pattern obtained from the laser beam reflected back from an outermost round area of the optical disk.

8. The method according to claim 7, wherein the determining step determines the process pattern of the focus control by interpolating the first round process pattern and the second round process pattern in terms of a radial position of the laser beam, and wherein the performing step performs the focus control based on the determined process pattern in response to the radial position of the laser beam.

9. A method of focus control of a laser beam relative to an optical disk rotated in an optical disk apparatus for writing or reading information by irradiation of the laser beam onto the rotated optical disk, the method comprising:
provisionally irradiating the laser beam onto a predetermined area of the optical disk;
monitoring the laser beam reflected back from the predetermined area to detect a variation of a spot diameter of the laser beam;
determining a process pattern of the focus control based on the detected variation of the spot diameter;
conducting the irradiation of the laser beam onto the rotated optical disk for writing or reading information;
performing the focus control to regulate a snot diameter of the laser beam based on the determined process pattern during conducting the irradiation of the laser beam;
rotatably mounting the optical disk having a recording face writeable with data information and a thermo-sensitive face opposite to the recording face and writeable with image information; and
irradiating the laser beam onto the thermo-sensitive face to thereby form the image information when the optical disk is mounted to expose the thermo-sensitive face, wherein the determining step determines the process pattern of the focus control such that the spot diameter of the laser beam irradiated onto the thermo-sensitive face is regulated greater than the spot diameter of the laser beam irradiated onto the recording face.

10. The method according to claim 9, further comprising the step of irradiating the laser beam onto the thermo-sensitive face of the optical disk to read therefrom the image information.

11. In an optical disk apparatus for writing or reading information by irradiation of a laser beam onto an optical disk while rotating the optical disk under a focus control of the laser beam relative to the rotated optical disk, a machine-readable medium embodying a program of instructions for execution by a machine to perform a focus control process, the process comprising:
provisionally irradiating the laser beam onto a predetermined area of the optical disk;
monitoring the laser beam reflected back from the predetermined area to detect a variation of a spot diameter of the laser beam;
determining a process pattern of the focus control based on the detected variation of the spot diameter;
conducting the irradiation of the laser beam onto the rotated optical disk for writing or reading information; and
performing the focus control to regulate a spot diameter of the laser beam based on the determined process pattern during conducting the irradiation of the laser beam,
wherein the determining step irradiates the laser beam along a predetermined round area during at least one turn of the optical disk, and monitors the laser beam reflected back from the predetermined round area so as to determine one round process pattern of the focus control in function of an angular position of the rotated optical disk, and the performing step performs the focus control based on the determined one round process pattern in response to the angular position of the rotated optical disk.

12. The machine-readable medium according to claim 11, wherein the determining step determines a process pattern of the focus control based on a first round process pattern obtained from the laser beam reflected back from an innermost round area of the optical disk and a second round process pattern obtained from the laser beam reflected back from an outermost round area of the optical disk.

13. The machine-readable medium according to claim 12, wherein the determining step determines the process pattern of the focus control by interpolating the first round process pattern and the second round process pattern in terms of a radial position of the laser beam, and wherein the performing step performs the focus control based on the determined process pattern in response to the radial position of the laser beam.

14. In an optical disk apparatus for writing or reading information by irradiation of a laser beam onto an optical disk while rotating the optical disk under a focus control of the laser beam relative to the rotated optical disk, a machine-readable medium embodying a program of instructions for execution by a machine to perform a focus control process, the process comprising:
provisionally irradiating the laser beam onto a predetermined area of the optical disk;
monitoring the laser beam reflected back from the predetermined area to detect a variation of a spot diameter of the laser beam;
determining a process pattern of the focus control based on the detected variation of the spot diameter;
conducting the irradiation of the laser beam onto the rotated optical disk for writing or reading information; and
performing the focus control to regulate a spot diameter of the laser beam based on the determined process pattern during conducting the irradiation of the laser beam,
wherein the optical disk apparatus rotatably mounts an optical disk having a recording face writeable with data information and a thermo-sensitive face opposite to the recording face and writeable with image information, wherein the focus control process further comprises the step of irradiating the laser beam onto the thermo-sensitive face to thereby form the image information when the optical disk is mounted to expose the thermo-sensitive face, and wherein the determining step determines the process pattern of the focus control such that the spot diameter of the laser beam irradiated onto the thermo-sensitive face is regulated greater than the spot diameter of the laser beam irradiated onto the recording face.

15. The machine-readable medium according to claim 14, wherein the focus control process further comprises the step of irradiating the laser beam onto the thermo-sensitive face of the optical disk to read therefrom the image information.

* * * * *